(12) United States Patent
Kanada

(10) Patent No.: US 6,954,767 B1
(45) Date of Patent: Oct. 11, 2005

(54) SERVER AND METHOD FOR SEARCHING FOR IMAGE USING IMAGE PREFETCH, DESIGNATING DATABASE AND STORAGE DEVICES FOR SEARCHING, AND SETTING RETRIEVAL AND PROCESSING PARAMETERS FOR SEARCH

(75) Inventor: Shoji Kanada, Kaisei-machi (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 461 days.

(21) Appl. No.: 09/672,826

(22) Filed: Sep. 29, 2000

Related U.S. Application Data

(63) Continuation-in-part of application No. 09/540,531, filed on Mar. 31, 2000, now abandoned.

(30) Foreign Application Priority Data

| Mar. 31, 1999 | (JP) | ............................................. 11/92384 |
| Mar. 31, 1999 | (JP) | ............................................. 11/92385 |
| Mar. 31, 1999 | (JP) | ............................................. 11/92386 |
| Mar. 31, 1999 | (JP) | ............................................. 11/92387 |
| Mar. 31, 2000 | (JP) | ..................................... 2000/096559 |

(51) Int. Cl.⁷ ............................................. G06F 17/30
(52) U.S. Cl. ..................... 707/204; 707/104.1; 707/10; 382/131
(58) Field of Search ............................. 707/204, 104.1, 707/10; 600/425; 382/131

(56) References Cited

U.S. PATENT DOCUMENTS

| 4,737,921 A | * | 4/1988 | Goldwasser et al. ........ 395/121 |
| 4,958,283 A | * | 9/1990 | Tawara et al. ............... 382/131 |
| 5,241,472 A | * | 8/1993 | Gur et al. .................... 382/128 |
| 5,724,582 A | * | 3/1998 | Pelanek et al. .............. 707/204 |
| 5,807,256 A | * | 9/1998 | Taguchi et al. .............. 600/425 |
| 6,039,047 A | * | 3/2000 | Rock et al. .................. 128/897 |

* cited by examiner

Primary Examiner—Charles Rones
(74) Attorney, Agent, or Firm—Sughrue Mion, PLLC

(57) ABSTRACT

In an image search server which is connected to databases storing images and to image display terminals and searches the databases in response to a request from any of the image display terminals for displaying a search result on the terminal, responsiveness of an image search is improved while a search of all the databases is possible if necessary. An image search server stores images fetched from databases of image archiving apparatuses in storing means thereof, such as a hard disc. For each of the image display terminals, the image search server has setting defining whether the databases and the storing means or only the storing means are searched, and selects where to search according to the setting.

73 Claims, 17 Drawing Sheets

FIG.2

PAST-IMAGE SEARCH CONDITION SETTING

PAST-IMAGE SEARCH CONDITION LIST

| CONDITION REQUIRED FOR PAST IMAGE | | PAST IMAGE SEARCH CONDITION | | |
|---|---|---|---|---|
| DEPARTMENT | MODALITY | SAME DEPARTMENT | SAME MODALITY | PERIOD |
| NAIKA1 | CR | ○ | × | LATEST |
| GEKA2 | | × | ○ | 12M |

ADD
DELETE
CLOSE

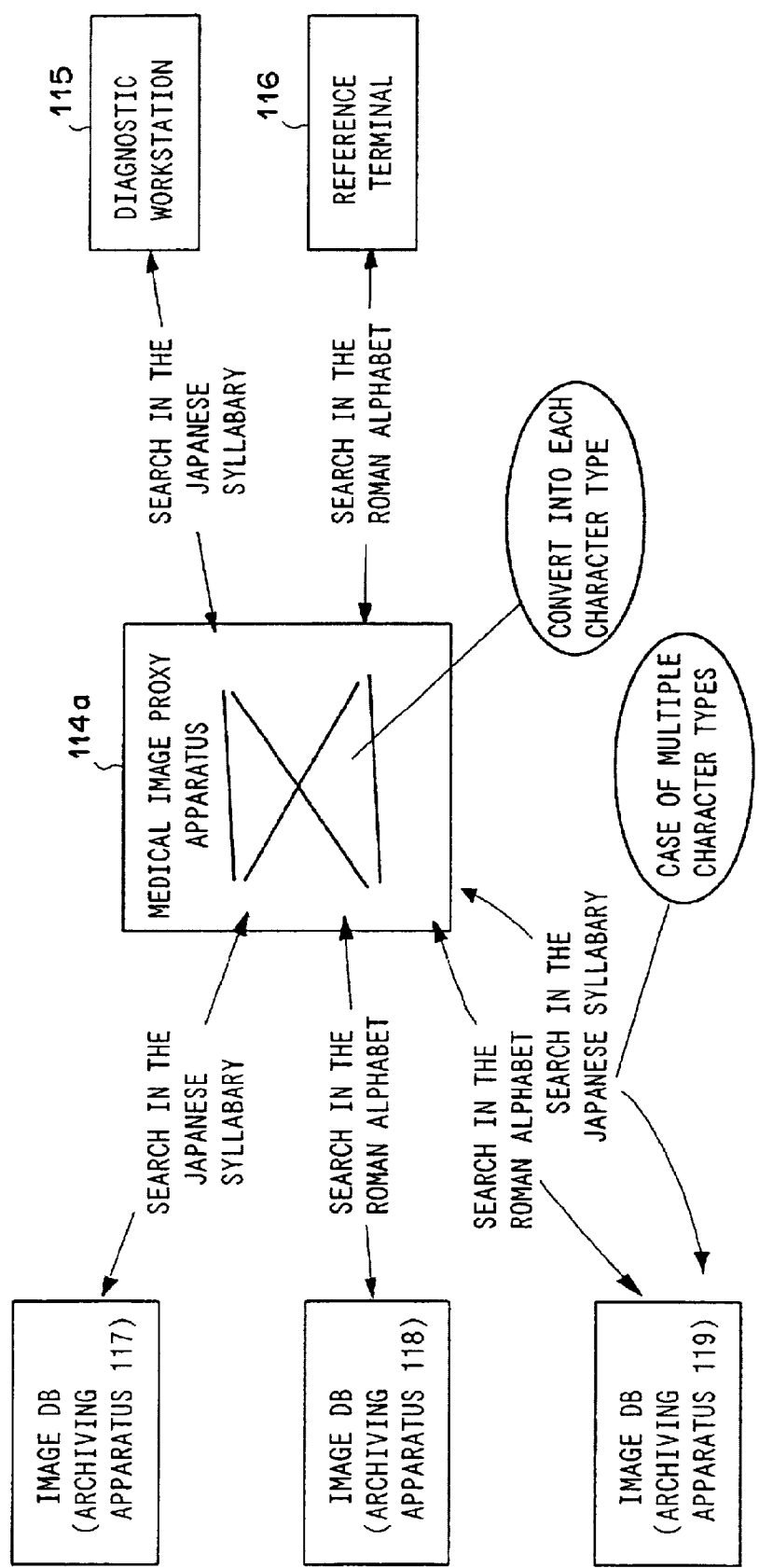
F I G. 12

SERVER AND METHOD FOR SEARCHING FOR IMAGE USING IMAGE PREFETCH, DESIGNATING DATABASE AND STORAGE DEVICES FOR SEARCHING, AND SETTING RETRIEVAL AND PROCESSING PARAMETERS FOR SEARCH

This application is a continuation-in-part application of Application 09/540,531, filed Mar. 31, 2000 now abandoned.

BACKGROUND OF THE INVENTION

1. Field of the Invention

The present invention relates to an image search server which is connected to a database storing images and to an image display terminal, and which searches the database in response to a request of the image display terminal to output a result of the search on the display terminal. More specifically, the present invention relates to an image search server comprising a function to retain images fetched from a database in storing means thereof, and to search for an image within the server, i.e. what is called a "pre-fetch function", and also to an image search method therefor. The present invention further relates to a medical image display system employing a medical image server comprising the pre-fetch function as described above.

2. Description of the Related Art

Images recorded by various kinds of image recording modalities for CT, MRI, CR and the like in a medical facility such as a hospital have been stored in a large capacity recording medium such as an optical disc. In this specification, an apparatus for storing images of this kind is called an "image archiving apparatus". Medical images are input from each image recording modality to an image archiving apparatus directly or via an image server connected to the archiving apparatus through a network, and the images are stored in the archiving apparatus.

The medical images are output from the image archiving apparatus to a terminal when the image server receives an output request from the terminal.

However, it takes a long time to output an image on a terminal if the image server fetches the image after receiving an output request from the terminal. Therefore, many medical image servers have what is called a "pre-fetch function" to retain images having the potential for output-request in a hard disc thereof before an actual output request is received. Medical image servers having the pre-fetch function have been configured in such a manner that all images recorded or images of patients subjected to examinations or diagnoses in a recent predetermined period are stored therein. When pre-fetching is carried out in this manner, it takes a long time for the image server to fetch the images from an image archiving apparatus and the image server needs a large-capacity hard disc, since the amount of the images to be retained in the server is large. Furthermore, in that case, a user has to select a necessary image out of the large volume of pre-fetched images, which is also time-consuming. Therefore, a first object of the present invention is to provide a medical image server and an image acquisition apparatus enabling reduction in pre-fetched images while maintaining a complete pre-fetching function, and a medical image display system which employs the above medical image server with the pre-fetch function to display medical images efficiently.

Many of the image recording modalities described above use a predetermined type of character among various character types such as the Japanese syllabary and the Roman alphabet for inputting information showing the name of a patient, for example. In this case, text information recorded in the database together with the images naturally uses the predetermined character type. Meanwhile, many terminals such as diagnostic workstations use only one type of character. In a situation like this, when a search request specifying the name of a patient in the Japanese syllabary is output from a terminal such as a diagnostic workstation or the like, the image may not be found due to the name of the patient being written in the Roman alphabet in the database, even if the image actually exists in the database. Therefore, a second object of the present invention is to provide a medical image searching method and a medical image search apparatus enabling a thorough search of a database regardless of the character type used in a search requesting apparatus and in the database, and enabling a proper notification of a search result to the search requesting apparatus.

In a conventional image search server having an image processing function, an image having been found is transferred from a database to an image display terminal via the image search server even if image processing is unnecessary for the image search server due to the image processing function of the image display terminal. As a result, it is time-consuming for the image to reach the image display terminal. Therefore, a third object of the present invention is to provide an image search server enabling a fast transfer of an image having been found from a database to an image display terminal retaining an image processing function which can be used as requested.

The image search server having the above search function is often configured in such a manner that the images of frequent use among the images in the database are retained in storing means thereof. When an image display terminal requests a search of an image from the image search server having the above configuration, the images of frequent use can be searched for promptly and an image can be obtained by searching all image information stored in the database. However, in such a conventional image search server having the function to search the storing means within the server, the database is searched unnecessarily in some cases, since the database is searched after the storing means within the server is searched. As a result, a response of the search is slow. Therefore, a fourth object of the present invention is to provide an image search server and an image searching method enabling a search of an image in a highly responsive manner while enabling a search of all databases as required.

SUMMARY OF THE INVENTION

A medical image server of the present invention for achieving the first object described above is a medical image server comprising image acquisition means for fetching an image from an image archiving apparatus storing medical images, storing means such as a hard disc for storing the image having been fetched, and delivering means for outputting the image stored in the storing means to a terminal. The medical image server further comprises:

pre-fetching judging means for judging whether acquisition (pre-fetch) of a past image of a patient which is stored in the image archiving apparatus is necessary or unnecessary before the terminal actually sends an order for output of the image, based on information regarding medical examination order and/or photographing of the patient; and pre-fetching image selecting means for selecting an image of the patient from the past images stored in the image archiving apparatus based on the information regarding the medical examination order and/or photographing in the case where the pre-fetching judging means has judged the acquisition to be necessary, and for causing the image acquisition means to fetch the selected image.

The pre-fetching judging means is preferably configured to judge whether the acquisition of the past image is necessary or unnecessary based on information from RIS (Radiology department Information System) and/or information attached to an image taken on the day. In addition, the pre-fetching judging means may be configured to judge the necessity of the pre-fetching based on a preset condition required for a past image to be acquired defined by one of or any combination of a department name such as an internal department or a surgical ward requesting image acquisition from a radiology department, a name of a doctor requesting the image acquisition, an image recording modality, and a photographing menu. Instead, the pre-fetching judging means may be configured to judge the necessity of the pre-fetching based on a judging standard which is one of or any combination of a name of an image requesting department, a name of an image requesting doctor, an image recording modality and a photographing menu, which are contained in information from RIS (Radiology department Information System) and/or information attached to an image taken on the day, by comparing the judging standard with a preset condition required for a past image to be acquired which is defined by one of or any combination of a name of an image requesting department, a name of an image requesting doctor, a image recording modality and a photographing menu. The pre-fetching image selecting means is preferably configured to determine a selection range of images based on information from RIS (Radiology department Information System) and/or information attached to an image taken on the day. The pre-fetching image selecting means may be configured to select the past image based on preset selection ranges of the name of the image requesting department, the name of the image requesting doctor, the image recording modality and the photographing menu, which are preset for each of the conditions required for the past image to be acquired. Instead, the pre-fetching image selecting means may be configured to select the past image based on a selection standard which is one of or any combination of a name of an image requesting department, a name of an image requesting doctor, an image recording modality and a photographing menu, which are contained in information from RIS (Radiology department Information System) and/or information attached to an image taken on the day, by comparing the selection standard with a preset selection condition preset for each of the conditions required for the past image to be acquired, wherein the selection condition is defined by one of or any combination of a name of an image requesting department, a name of an image requesting doctor, an image recording modality and a photographing menu. Therefore, it is preferable for the pre-fetching image selecting means to be capable of specifying a setting of a period in which the past image to be acquired was photographed, for each setting of the selection range. It is also preferable for the pre-fetching image selecting means to be configured to select only a past image of a patient having a medical examination appointment on the day and on the following day in the case where the image to be acquired is selected based on the medical examination order. It is more preferable for the selecting means in this case to select a past image of a patient having a medical examination appointment on the day in priority over a patient for the following day.

Furthermore, the medical image server of the present invention preferably comprises:

means for reducing or compressing a past image pre-fetched from the image archiving apparatus and stored in the storing means; and means for setting a reduction ratio or a compression ratio used by the means for reduction or compression, for one of or any combination of a name of an image requesting department, a name of an image requesting doctor, an image recording modality and a photographing menu regarding the past image.

In addition, the medical image server of the present invention preferably comprises controlling means which causes the image selection by the pre-fetching image selecting means and the acquisition of the selected image by the image acquisition means to be executed at predetermined times.

Furthermore, the medical image server of the present invention preferably comprises controlling means which retains information of a medical examination order and causes the image selection by the pre-fetching image selecting means and the acquisition of the selected image by the image acquisition means to be executed based on the information of the medical examination order, wherein the controlling means compares check-in information of a patient to be photographed and appointment information when receiving the check-in information on the day of the medical examination and causes selection of an additional image by the pre-fetching image selecting means and acquisition of the selected additional image by the image acquisition means to be executed only if the check-in information was not identical with the appointment information.

In addition, the medical image server of the present invention preferably comprises controlling means which causes the delivery of the image by the delivering means to be executed after letting the delivering means wait until a predetermined time.

Furthermore, the medical image server of the present invention preferably comprises controlling means which causes the image selection by the pre-fetching image selecting means and the acquisition of the selected image by the image acquisition means to be executed at a time of appointment of a medical examination order and which causes the delivery of the image by the delivering means to be executed when receiving check-in information on the day of the medical examination.

In addition, the medical image server of the present invention preferably comprises controlling means which causes the image selection by the pre-fetching image selecting means and the acquisition of the selected image by the image acquisition means to be executed at a time of appointment of a medical examination order or when receiving check-in information on the day of the medical examination, and which causes the delivery of the image by the delivering means to be executed when receiving information indicating completion of the photographing from an image recording device or RIS (Radiology department Information System).

Furthermore, the medical image server of the present invention preferably comprises controlling means which causes the delivery of the image by the delivering means to be executed when the image is input from the image recording device.

In addition, the medical image server of the present invention preferably comprises controlling means which can be used to specify periods in which the delivering means is allowed to deliver the image, and which suspends the delivery of the image until the next specified period when the output request is received at a time out of any specified period.

Furthermore, the medical image server of the present invention preferably comprises:

delivery judging means for judging whether the delivery of the image stored in the storing means is necessary or unnecessary based on information regarding a medical examination order and/or photographing of a patient;

means for selecting an image to be delivered which selects the image to be delivered from past images of the patient stored in the storing means based on the information regarding the medical examination order and/or photographing and which causes the delivering means to deliver the selected image; and means for determining a past-image delivery destination which determines a destination to which the delivering means delivers the selected image, wherein the destination is determined based on the information regarding the medical examination order and/or photographing.

The delivery judging means of the above medical image server is preferably configured to judge whether the delivery of the past image is necessary or unnecessary based on the information from RIS (Radiology department Information System) and/or the information attached to the image taken on the day. In addition, the delivery judging means is preferably configured to judge whether the delivery of the past image is necessary or unnecessary based on a preset condition required for a past image to be acquired defined by one of or any combination of a name of an image requesting department, a name of an image requesting doctor, an image recording modality, and a photographing menu. Instead, the delivery judging means may be configured to judge whether the delivery of the past image is necessary or unnecessary based on a judging standard which is one of or any combination of a name of an image requesting department, a name of an image requesting doctor, an image recording modality and a photographing menu, which are contained in information from RIS (Radiology department Information System) and/or information attached to the image taken on the day, by comparing the judging standard with a condition required for a past image to be acquired which is defined by one of or any combination of a name of an image requesting department, a name of an image requesting doctor, an image recording modality and a photographing menu.

The means for selecting the image to be delivered in the above medical image server is preferably configured to determine a selection range of the image based on information from RIS (Radiology department Information System) and/or information attached to the image taken on the day. In addition, the means for selecting the image to be delivered is preferably configured to select the image based on preset selection ranges of a name of an image requesting department, a name of an image requesting doctor, an image recording modality and a photographing menu, which are preset for each of the conditions required for the past image to be acquired. Instead, the means for selecting the image to be delivered may be configured to select the past image based on a selection standard which is one of or any combination of a name of an image requesting department, a name of an image requesting doctor, an image recording modality and a photographing menu, which are contained in information from RIS (Radiology department Information System) and/or information attached to an image taken on the day, by comparing the selection standard with a preset selection condition preset for each of the conditions required for a past image to be acquired, wherein the selection condition is defined by one of or any combination of a name of an image requesting department, a name of an image requesting doctor, an image recording modality and a photographing menu. In addition, the means for selecting the image to be delivered is preferably configured to be capable of specifying a setting of a period in which the past image was photographed, for each setting of the selection range. Furthermore, the means for selecting the image to be delivered is preferably configured to select only a past image of the patient having the medical examination appointment on the day and on the following day in the case where the image is selected based on the medical examination order. In addition, the means for selecting the image to be delivered is preferably configured to select a past image of a patient having a medical examination appointment on the day in priority over a patient for the following day.

The means for determining the past-image delivery destination is preferably configured to determine the delivery destination based on information from RIS (Radiology department Information System) and/or information attached to an image taken on the day. In addition, the means for determining the past-image delivery destination is preferably configured to determine the delivery destination based on a preset delivery destination defined by one of or any combination of a name of an image requesting department, a name of an image requesting doctor, an image recording modality, and a photographing menu. Instead, the means for determining the past-image delivery destination may be configured to determine the delivery destination based on a destination-determining standard which is one of or any combination of a name of an image requesting department, a name of an image requesting doctor, an image recording modality and a photographing menu, which are contained in information from RIS (Radiology department Information System) and/or information attached to an image taken on the day, by referring to a preset delivery destination which is defined by one of or any combination of a name of an image requesting department, a name of an image requesting doctor, an image recording modality and a photographing menu. Further, the means for determining the past-image delivery destination is preferably configured to be capable of specifying a plurality of delivery destinations for a single image.

Moreover, the medical image server of the present invention preferably comprises controlling means which searches a database at the delivery destination determined by the means for determining the past-image delivery destination and which causes the delivering means to cancel the delivery of the image if the database contained the image selected by the means for selecting the image to be delivered.

In addition, the medical image server of the present invention preferably comprises:

means for delivering an image taken on the day which delivers an image taken and recorded by an image recording modality to a separated terminal when receiving an order for output from the separated terminal on the day of recording; and means for determining a delivery destination of the image taken on the day which is delivered by the means for delivering the image based on the information regarding a medical examination order and/or photographing of a patient.

The above means for determining the delivery destination of the image taken on the day is preferably configured to determine the delivery destination based on information from RIS (Radiology department Information System) and/ or information attached to the image taken on the day. In addition, the means for determining the delivery destination of the image taken on the day is preferably configured to determine the delivery destination based on a preset delivery destination defined by one of or any combination of a name of an image requesting department, a name of an image requesting doctor, an image recording modality, and a photographing menu. Instead, the means for determining the delivery destination of the image taken on the day may be configured to determine the delivery destination based on a destination-determining standard which is one of or any combination of a name of an image requesting department, a name of an image requesting doctor, an image recording modality and a photographing menu, which are contained in information from RIS (Radiology department Information System) and/or information attached to the image taken on the day, by referring to a preset delivery destination which is defined by one of or any combination of a name of an image requesting department, a name of an image requesting doctor, an image recording modality and a photographing menu. Furthermore, the means for determining the delivery destination of the image taken on the day is preferably configured to determine the delivery destination based on a code input by RIS (Radiology department Information System) or attached to the image, according to preset combinations of the delivery destinations and the codes so that each of the codes specifies one of the destinations directly. In addition, the means for determining the delivery destination of the image taken on the day is preferably configured to be capable of specifying a plurality of delivery destinations for a single image.

The means for determining the delivery destination of the image taken on the day and the means for determining the past-image delivery destination are preferably configured to handle the delivery destinations according to the same settings and to deliver the images to the same device.

The medical image display system according to the present invention is a medical image display system employing the medical image server according to the present invention described above and comprises:

a workstation comprising display means capable of displaying an image stored in the medical image server, judging means for judging whether or not an image need to be displayed is stored in the workstation, and means for sending to the medical server an order for output of the image need to be displayed when the judging means judges that the image is not stored in the workstation; wherein the medical server is configured to judge whether or not the image specified by the order for output is stored in the storing means when receiving the order for output from the workstation, to deliver the image therein to the workstation if the image was stored in the storing means, and to deliver the image to the workstation after fetching the image from the image archiving apparatus if the image was not stored in the storing means.

A pre-fetching image-acquisition method according to the present invention is a method used in a medical image server comprising image acquisition means for fetching an image from an image archiving apparatus storing medical images, storing means for storing the image having been fetched, and means for outputting the image stored in the storing means to a terminal when receiving an order for output of the image therefrom. The image acquisition method comprises the steps of:

judging whether acquisition of past images regarding a patient having been stored in the image archiving apparatus is necessary or unnecessary before the terminal actually sends the order for output of the image, based on information regarding a medical examination order and/or photographing of the patient; and selecting an image of the patient from the past images stored in the image archiving apparatus, based on the information regarding the examination order and/or photographing, in the case where the acquisition is judged to be necessary, and causing the image acquisition means to fetch the selected image.

In the pre-fetching image-acquisition method according to the present invention, it is preferable to judge whether delivery of the image stored in the storing means is necessary or unnecessary based on information regarding the medical examination order and/or photographing of the patient, to select the image from the past images of the patient stored in the storing means based on the information regarding the medical examination order and/or photographing, and to cause the delivering means to deliver the selected image, wherein a destination to which the delivering means delivers the selected image is determined based on the information regarding the medical examination order and/or photographing. Further, in the pre-fetching image-acquisition method according to the present invention, it is preferable to deliver an image taken and recorded by an image recording modality to a separated terminal in the case where an order for output is sent from the separated terminal on the day of recording, wherein a delivery destination of the image is determined based on the information regarding the medical examination order and/or photographing of the patient.

The medical image server of the present invention for achieving the first object is configured to fetch an image selected based on the information regarding the examination order and/or photographing of the patient from the past images of the patient stored in the image archiving apparatus, after judging the necessity of pre-fetching of the past image based on the information regarding the examination order and/or photographing of the patient. Therefore, even if an image is a recently photographed image or an image of a patient who underwent a recent examination or diagnosis, the image is not pre-fetched if the image has been judged to be unnecessary or to not meet the selection condition.

Therefore, according to this medical image server, the number of the images to be stored after pre-fetching is comparatively small, and the time necessary for inputting the images to be pre-fetched from the archiving apparatus is thus shortened. As a result, the storing means such as a hard disc having comparatively small capacity is sufficient. Furthermore, a user can select an image to be output from a comparatively small number of pre-fetched images, which leads to an easier operation upon outputting the image to the terminal.

In the case where the medical image server of the present invention comprises the means for reducing or compressing the image to be stored in the storing means after acquisition of the image from the image archiving apparatus, and the means for setting the ratio of reduction or compression for one or any combination of a name of an image requesting department, a name of an image requesting doctor, an image recording modality and a photographing menu, space of the storing means necessary for pre-fetching one image is further reduced. Meanwhile, since the reduction ratio or the compression ratio can be set in accordance with the image requesting department, the name of the image requesting doctor, the image recording modality, or the photographing menu, severe degradation of an output image due to reduction or compression processing is prevented.

It is possible to deliver a past image, which has been pre-f etched and stored in the storing means, to an appropriate delivery destination thereof correctly and immediately in the case where the medical image server of the present invention especially comprises the delivery judging means for judging whether the delivery of the image stored in the storing means is necessary or unnecessary based on the information regarding the medical examination order and/or photographing of the patient, the means for selecting an image to be delivered which selects the image from the past images of the patient stored in the storing means based on the information regarding the medical examination order and/or photographing and which causes the delivering means to deliver the selected image, and the means for determining the past-image delivery destination which determines the destination to which the delivering means delivers the selected image, wherein the destination is determined based on the information regarding the medical examination order and/or photographing.

Moreover, it is possible to deliver an image taken on the day to an appropriate destination thereof correctly and immediately in the case where the medical image server of the present invention especially comprises the means for delivering the image taken on the day which delivers the image recorded by the image recording modality to the separated terminal when receiving the order for output from the separated terminal on the day of recording, and the means for determining the delivery destination of the image taken on the day, which is delivered by the means for delivering the image, based on the information regarding the medical examination order and/or photographing of the patient.

In addition, it is possible to display an image need to be displayed immediately and efficiently according to the present invention, as the medical image display system of the present invention comprises the workstation comprising display means capable of displaying the image stored in the workstation, the judging means for judging whether or not the image need to be displayed is stored in the workstation, and means for sending to the medical server an order for output of the image need to be displayed when the judging means judges that the image is not stored in the workstation, wherein the medical image server is configured to judge whether or not the image specified by the order for output is stored in the storing means when receiving the order for output from the workstation, to deliver the image therein to the workstation if the image was stored in the storing means, and to deliver the image to the workstation after fetching the image from the image archiving apparatus if the image was not stored in the storing means.

A medical image search apparatus of the present invention for achieving the second object described above is a medical image search apparatus which is connected to a search requesting apparatus such as a diagnostic workstation and to a database storing medical images with text information, and searches the database for a desired image according to search information from the search requesting apparatus to send a search result including text information to the search requesting apparatus. The medical image search apparatus comprises character type converting means for carrying out character type conversion between a character type used by the database and a character type used by the search requesting apparatus, so that the medical image search apparatus can carry out the search after converting the search information received from the search requesting apparatus into search information in the character type used by the database and different from the character type used by the search requesting apparatus and can send the search result to the search requesting apparatus after the search result has been converted into the character type used by the search requesting apparatus.

In the case where the medical image search apparatus of the present invention is connected to a plurality of search requesting apparatuses, it is preferable for the character type converting means to be configured to carry out the conversion between the character types used by each of the search requesting apparatuses and the database. Furthermore, in the case where the medical image search apparatus having the above configuration is connected to a plurality of databases, it is preferable for the medical image search apparatus to search all the databases after converting the search information received from the search requesting apparatus into search information in a character type used by each of the databases, and to send the search result to the search requesting apparatus after conversion of the search result into the character type used by the search requesting apparatus.

It is possible that some images in a database have accompanying information in the Japanese syllabary while others have information in the Roman alphabet. In the case where the medical image search apparatus of the present invention is connected to a multiple character-type database in which a plurality of images having text information in different character types are stored, it is preferable for the medical image search apparatus of the present invention to obtain search information in all character types used by the database from the search information received from the search requesting apparatus, and to search the database according to the search information in each character type so that the search result can be sent to the search requesting apparatus after conversion of the result into the character type used by the search requesting apparatus.

A medical image searching method of the present invention is a method used in a medical image search apparatus which is connected to a search requesting apparatus such as a diagnostic workstation and to a database storing medical images with text information, and searches the database for a desired image according to search information from the search requesting apparatus to send a search result including text information to the search requesting apparatus. The medical image searching method comprises the steps of:

searching for the desired image after converting the search information received from the search requesting apparatus to search information in a character type used by the database and different from a character type used by the search requesting apparatus; and sending the search result to the search requesting apparatus after the search result has been converted into the character type used by the search requesting apparatus.

In the present invention according to the second object, a search is carried out after conversion of the search information received from the search requesting apparatus into the search information in the character type used by the database and different from the character type used by the search requesting apparatus, and the search result is sent to the search requesting apparatus after conversion of the search result into the result in the character type used by the search requesting apparatus. Therefore, regardless of the character types used by the search requesting apparatus and by the database, the database can be searched thoroughly and the search result can be sent properly to the search requesting apparatus.

An image search server of the present invention for achieving the third object described above is an image search server connected to an image display terminal and to a database storing images as has been described above, and carries out a search of the database in response to a request of the image display terminal to output a search result to the terminal. The image search server comprises:

image processing means for carrying out predetermined image processing on the image obtained by the search;

storing means for storing the image having been subjected to the image processing by the image processing means;

judging means for judging whether or not image processing is necessary for the image having been searched for; and control means for transmitting to the image display terminal a search result including information indicating a location of the image in the database in the case where the judging means has judged image processing to be unnecessary or for transmitting a search result including information indicating that the image is located in the storing means while obtaining the image from the database for causing the image to be subjected to the image processing by the image processing means in the case where the judging means has judged the image processing to be necessary.

In the case where the image search server is connected to a plurality of databases, the information sent by the control means to the image display terminal to indicate the location of the image in the database is assumed to show which of the databases has the image. Furthermore, in the case where the image search server is connected to a plurality of image display terminals, it is preferable for the judging means to have setting defining necessity or lack of necessity of image processing for each display terminal and to judge according to the setting. It is also preferable for the judging means to have setting defining necessity or lack of necessity of image processing by the image processing means for each modality having recorded the images to be stored, and to judge according to the setting.

As has been described above, in the case where the judging means has judged the image processing to be unnecessary, the image search server of the present invention according to the third object can send to the image display terminal the search result including information indicating the location of the image in the database. Therefore, the image display terminal can obtain the image directly from the database according to the information indicating the location of the image, and unnecessary transfer of the image to the image search server is omitted. As a result, the image can be transferred promptly to the image display terminal.

Meanwhile, in the case where the judging means has judged the image processing to be necessary, the image search server of the present invention sends to the image display terminal the search result, including the information indicating that the image is located in the storing means of the image search server, and obtains the image from the database to cause the image to be subjected to the image processing by the image processing means. Therefore, the image display terminal can obtain the image from the storing means according to the information indicating the location thereof and the image having been subjected to the image processing can be obtained.

An image search server of the present invention for achieving the fourth object described above is an image search server connected to a database storing images as has been described above and to a plurality of image display terminals, and the image search server searches the database in response to a search request of any of the image display terminals and outputs a search result to the image display terminal. The image search server comprises:

storing means for storing an image obtained from the database; and control means having, for each of the image display terminals, setting defining whether only the storing means or the storing means as well as the database are searched, and for determining where to search according to the setting for each terminal.

Another image search server of the present invention is an image search server connected to a database storing images as has been described above, and to a plurality of image display terminals, and the image search server searches the database in response to a request of any of the image display terminals to display a search result on the terminal. The image search server comprises:

storing means for storing an image obtained from the database; and control means having, for each image recording modality, setting defining whether only the storing means or the storing means as well as the database are searched, and for determining where to search according to the setting for each image recording modality.

Another image searching method of the present invention is for an image search server which is connected to a database storing images and to a plurality of image display terminals and searches the database in response to a search request of any of the image display terminals to output a search result on the display terminal. The image searching method comprises the steps of:

storing an image obtained from the database; and determining where to search for each image display terminal according to setting defining for each image display terminal whether only the storing means or the storing means as well as the database are searched.

Still another image searching method of the present invention is for an image search server which is connected to a database storing images and to a plurality of image display terminals and searches the database in response to a search request of any of the image display terminals to output a search result on the display terminal. The image searching method comprises the steps of:

storing an image obtained from the database; and determining where to search for each image recording modality, according to setting defining for each modality whether only the storing means or the storing means as well as the database are searched.

The present invention for achieving the fourth object is configured to determine, for each image display terminal or for each image recording modality, whether only the storing means or the storing means as well as the database are searched. Therefore, a search of the database is omitted if unnecessary and responsiveness of the search is greatly improved.

The above and many other objects, features and advantages of the present invention will become manifest to those skilled in the art upon making reference to the following detailed description and accompanying drawings in which preferred embodiments incorporating the principle of the present invention are shown by way of illustrative example.

BRIEF DESCRIPTION OF THE DRAWINGS

FIG. 2 is an example of a monitor screen of the medical image server shown in FIG. 1 for specifying the setting concerning selection of images to be pre-fetched;

FIG. 12 is a diagram explaining character type conversion in the medical image search apparatus shown in FIG. 11;

DESCRIPTION OF THE PREFERRED EMBODIMENTS

Figure 1:
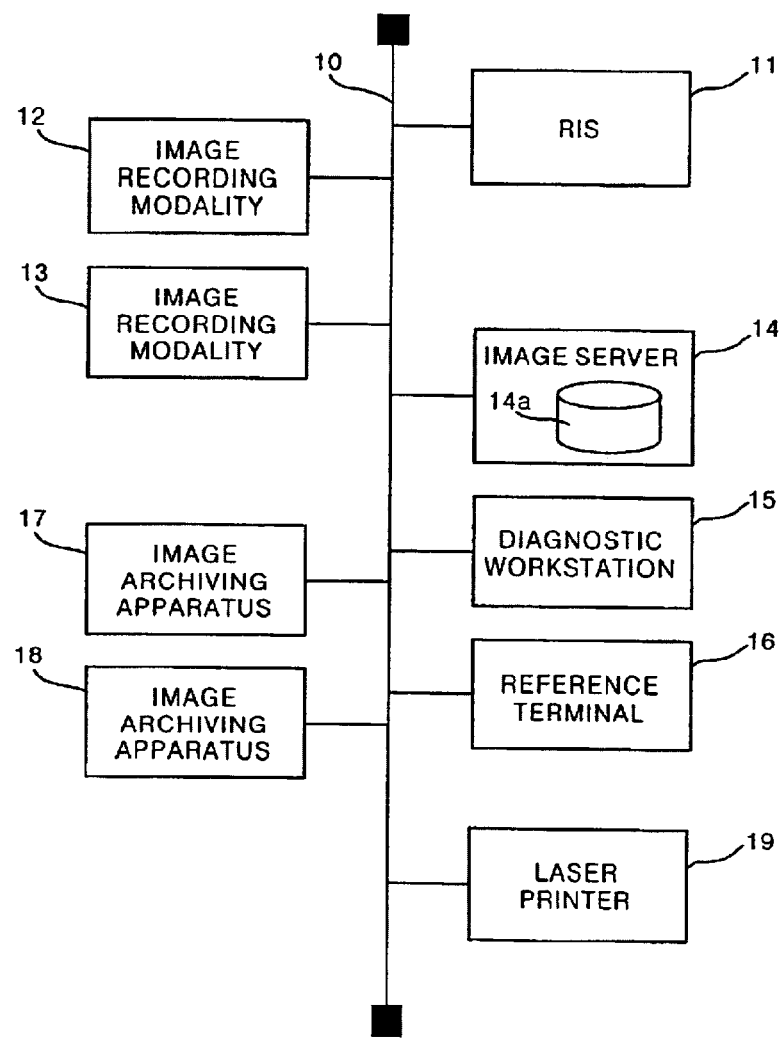
FIG. 1 is a diagram showing an outline of a medical network system including the medical image server according to one embodiment of the present invention.

Hereinafter, embodiments of the present invention will be explained with reference to the accompanying drawings. FIG. 1 shows a medical network system including a medical image server according to one embodiment of the present invention.

In the system shown in FIG. 1, a network 10 is a local area network (LAN) such as the Ethernet or an FDDI, installed in a hospital. The network may be connected to the Internet via a dedicated line or a public telecommunication line such as ISDN.

A radiology department information system (RIS) 11, image recording modalities 12 and 13, an image server 14, a diagnostic workstation 15 which is a terminal, a reference terminal 16, image archiving apparatuses 17 and 18, a laser printer 19, and the like are connected to the network 10.

The image recording modalities 12 and 13 are apparatuses or systems for CT, MRI, CR, RI, US and the like for recording images of patients as digital data. The image recording modalities may record image signals obtained by photographing after conversion of the analog signal into digital data or obtain digital data by reading images of patients recorded on a film or the like upon photographing.

The radiology department information system 11 is connected to terminals not shown in FIG. 1 and placed in a radiology department or other medical departments such as an internal department or a surgical ward requesting image recording to the radiology department, and the system carries out information transmission and processing based on examination order information (photographing order or the like pertaining to the radiology department) regarding patients of the requesting departments or on photographing information in the image recording modalities 12 and 13.

The image server 14 is a computer which makes image data recorded by the image recording modalities 12 and 13 be stored in the image archiving apparatus 17 or 18, and which reads desired image data from the image data in the archiving apparatuses according to a request from the diagnostic workstation 15 or the reference terminal 16, to transfer the image data thereto. Instead, the image data recorded by the image recording modalities 12 and 13 may be stored directly in the image archiving apparatus 17 or 18, not through the image server 14.

The diagnostic workstation 15 is a terminal used by a radiologist or the like for carrying out a diagnosis while referring to the image data and carrying out image processing to generate an image appropriate for diagnosis by changing an image processing parameter and the like as required.

The reference terminal 16 is a terminal only for referring to image data. The laser printer 19 outputs processed image data as a visible image. Image output on the laser printer 19 is executed by an instruction from the diagnostic workstation 15 to the image server 14.

This medical network system is configured according to the DICOM (Digital Imaging and Communications in Medicine) standard generated by the ACR-NEMA committee (ACR: American College of Radiology, NEMA: National Electrical Manufacturers Association), for example.

The DICOM standard is a standard for realizing an object-oriented medical network system and defines the content and data structure of various kinds of diagnostic information such as CT image information, examination information, and patient information, and a procedure of exchanging such diagnostic information as a message (a procedure of requesting a service such as storing, acquisition, printing and inquiry about the image). In the DICOM standard, a data format of information necessary in a medical system, such as patient information and examination information, is defined in detail, and the DICOM standard also defines an interface for requesting processing upon inquiry of various kinds of information, for example.

The image server 14 searches for desired image data among the image data stored in the archiving apparatus 17 or 18 according to a request from the workstation 15 or the reference terminal 16, and reads the desired data from the apparatus. In order to promptly respond to such a request, the image server has a function to read image data whose output is highly likely to be requested and to store the data in an internal hard disc 14a. Hereinafter, this function, a pre-fetch function in other words, will be explained in detail.

The image server 14 comprises, in addition to the hard disc 14a, image acquisition means for acquiring an image from the archiving apparatus 17 or 18, output means for outputting an image stored in the hard disc 14a to the diagnostic workstation or to the reference terminal 16 when an order for output is received from the workstation or from the terminal, judging means for judging whether pre-fetching of past images regarding a patient stored in the archiving apparatus 17 or 18 is necessary or unnecessary based on information regarding an examination order and/or photographing of the patient, and image selecting means for selecting an image from the past images of the patient stored in the archiving apparatus 17 or 18 based on information regarding an examination order and/or photographing and for causing the image acquisition means to fetch the selected image in the case where the judging means has judged the pre-fetching to be necessary. In the present embodiment, the image acquisition means, the output means, the judging means and the image selecting means are included in the image server 14 and processing by each means is executed based on a predetermined computer program.

In other words, the image server 14 has a past-image acquisition condition (a condition required for a past image to be pre-fetched) defined in advance by one of or any combination of a name of a department requesting image data, an image recording modality, and a photographing menu, and judges whether the pre-fetching is necessary or unnecessary based on the condition. For more specific explanation, FIG. 2 shows a monitor screen of the image server 14 for specifying the setting of the past-image search condition for pre-fetching. In this example, a first past-image acquisition condition is set as the case where the department requesting image data is "NAIKA1" (a first internal department) and the image recording modality is a CR (Computed Radiography) apparatus, and a second past-image acquisition condition is set as the case where the department requesting image data is "GEKA2" (a second surgical ward).

The image server 14 has a preset selection range regarding the name of the image requesting department and the image recording modality, for each of the two past-image acquisition conditions. Based on the setting, the image server 14 selects images to be pre-fetched. In other words, in the example shown in FIG. 2, a group of the past images related to the same image requesting department is set to be the selection range (search range) of the past images to be pre-fetched for the first past-image acquisition condition. Meanwhile, for the second past-image acquisition condition, a group of the past images pertaining to the same modality is set as the selection range. In such a manner, the images to be pre-fetched are selected within the selection range.

Furthermore, in the present example, a photographing period of past images to be pre-fetched is also specifiable for each setting of the selection range. In other words, as shown in FIG. 2, when the selection range for the first past-image acquisition condition refers to past images related to the same image requesting department, setting is specified to acquire the latest image, while the setting is specified to acquire the images photographed in the past 12 months (displayed as 12M in the screen) when the selection range for the second past-image acquisition condition refers to past images related to the same image recording modality.

The setting for the selection range (search range) and the past-image acquisition condition can be added or deleted by a user as required.

Actual pre-fetching processing carried out according to the setting described above will be explained next. The radiology department information system 11 receives examination order information from any department such as an internal department or a surgical ward. The examination order information may include the date of examination, the ID number of a patient, a modality code, a code of the image requesting department and a status, for example.

The "status" in the above refers to four cases. The four cases are (1) check-in finished: the patient has been accepted at the radiology department, (2) order received: photographing has been reserved, (3) batch processing at night: photographing on the following day or later has been reserved, and (4) check-up reserved: medical check-up has been reserved. Since a situation in which pre-fetching is necessary is different depending on each medical facility, it becomes possible, by defining such statuses, to practice pre-fetching only for the status enabling pre-fetching.

The examination order information described above is transferred to the image server 14. The image server 14 judges whether or not past images of the patient stored in the archiving apparatus 17 or 18 need to be pre-fetched, based on the examination order information. In the case where pre-fetching has been judged to be necessary, the image server 14 searches for and selects the past images of the patient stored in the archiving apparatus 17 or 18, within the selection range having been set.

In other words, in the example shown in FIG. 2, if the first internal department requests examination of a patient and if the image recording modality is CR, pre-fetching is judged to be necessary. Likewise, in the case where the second surgical ward requests examination, pre-fetching is also judged to be necessary. In the former case, among past images of the patient pertaining to the first internal department and stored in the archiving apparatus 17 or 18, the latest image is searched for and selected. The selected image is then stored in the hard disc 14a of the image server 14. In the latter case, among past images of the patient recorded by the same image recording modality and stored in the archiving apparatus 17 or 18, images photographed in the past 12 months are searched for and selected. The selected image or images are then stored in the hard disc 14a of the image server 14.

Figure 3:
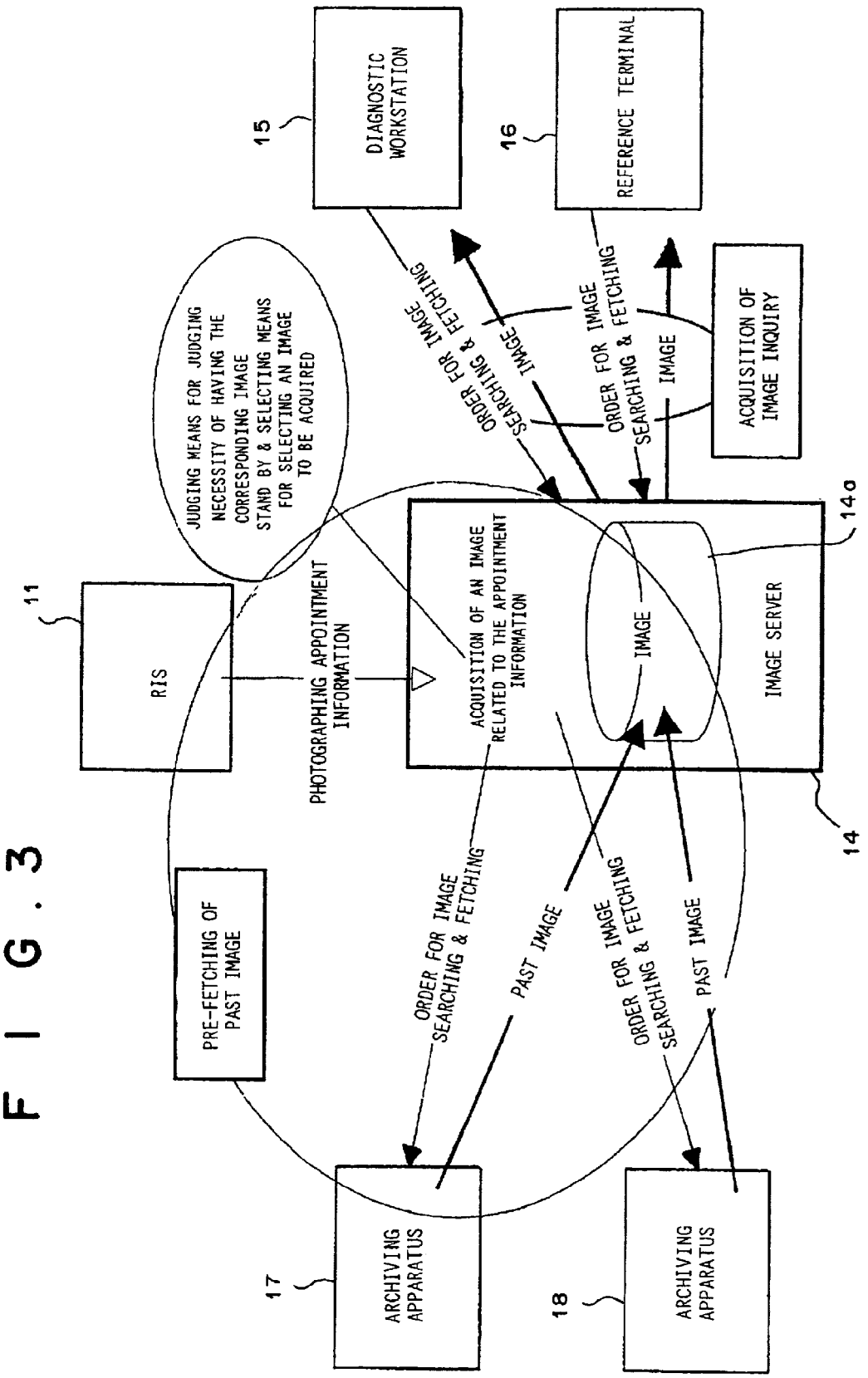
FIG. 3 is a diagram illustrating functions of an image display system employing the medical image server shown in FIG. 1.

FIG. 3 schematically illustrates the pre-fetch function for pre-fetching the past image as described above.

The images having been pre-fetched in this manner are highly likely to be output-requested later by the diagnostic workstation 15 or the reference terminal 16. When an actual order of output is received, the image pre-fetched and stored in the hard disc 14a can be output. Therefore, a fast response to the order for output can be realized, without drawing the image from the archiving apparatus 17 or 18.

In the above apparatus, the necessity of pre-fetching of the past images of the patient is judged in advance and the images to be pre-fetched are selected based on the examination order information. Therefore, the number of the images to be pre-fetched is comparatively small. As a result, the time necessary for receiving the images to be pre-fetched from the archiving apparatus 17 or 18 is also reduced, and the capacity of the hard disc 14a can be comparatively small. Furthermore, a user can select an image to be output among the comparatively small number of pre-fetched images upon outputting the image on the diagnostic workstation 15 or the reference terminal 16, and an operation for image output becomes easier.

In the case where the images to be pre-fetched are selected based on the examination order information, the number of the images to be pre-fetched can be reduced further by specifying only past images of patients having an examination appointment on the day and on the following day to be pre-fetched.

In that case, an order for output regarding a past image of a patient having an appointment on the day is more likely to be sent prior to an order for output regarding a patient having an appointment on the following day. Therefore, it is preferable for the image server to prioritize pre-fetch of the past images of the patient having an appointment on the day.

In the embodiment described above, judgment regarding the necessity of pre-fetching and the selection of the images to be pre-fetched are carried out according to the examination order. However, it is also possible to carry out the judgment and the image selection based on information regarding the image recording modality 12 or 13 or regarding actual photographing.

Furthermore, in the embodiment described above, the conditions for judging the necessity of pre-fetching and the selection range of the images to be pre-fetched are set for each combination of the image requesting department and the image recording modality. However, the setting may be defined for each combination including a photographing menu such as ordinary photographing, shadow graphic photographing, and combinational photographing, in addition to the image requesting department and the image recording modality. Moreover, the setting may be defined for each requesting department, each image recording modality and each photographing menu.

Figure 4:
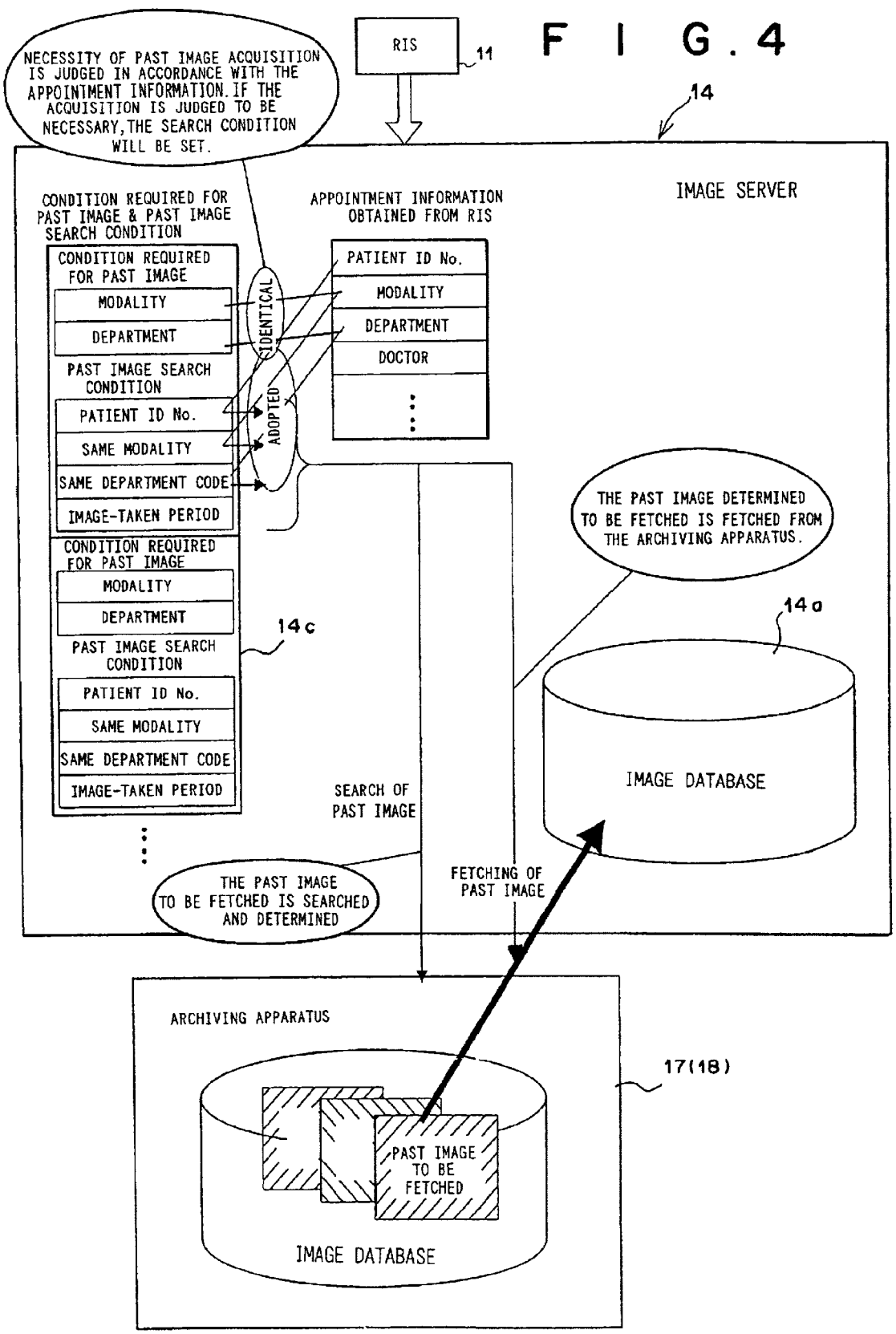
FIG. 4 is a diagram illustrating a process of pre-fetching a past image carried out in the medical image server according to another embodiment of the present invention.

Now, another embodiment of the present invention will be explained in the following. In this embodiment, setting of the selection range of the image to be pre-fetched is determined using conditions different from those described above. FIG. 4 schematically illustrates a pre-fetching process according to the present embodiment. An overall structure of an image display system for carrying out the pre-fetching process is basically the same as the structure shown in FIG. 1.

In the present embodiment, an image server 14 presets the combinations of the image recording modality and the image requesting department as the past-image acquisition conditions (the condition required for an past image to be pre-fetched) and presets the combinations of an ID number of the patient, the modality, the image requesting department and the period in which the image was photographed as the past-image search conditions. Each of the past-image acquisition conditions is associated with one of the past-image search conditions, and the associated pairs are recorded in the form of a reference table 14c. There are a plurality of such associated pairs set in the reference table 14c.

A radiology department information system (RIS) 11 sends examination order information (photographing appointment information) of a patient to the image server 14. The examination order information for each patient includes several items such as the ID number, the modality, the name of the image requesting department and the name of the image requesting doctor associated with the patient.

The image server 14 judges whether or not the combination of the modality and the image requesting department contained in the information sent by the radiology department information system (RIS) 11 is identical to one of those combinations which have been set as the past-image acquisition condition. In the case where the image server 14 finds out the identical combination, one of the items constituting the past-image search condition set in association with the past-image acquisition condition, i.e. one of the ID number, the modality and the name of the image requesting department each contained in the information sent by the radiology department information system (RIS) 11, is selected as a search condition to be actually used.

The image server 14 searches through those images stored in an archiving apparatus 17 or 18 based on the search condition after selecting one of the ID number, the modality and the name of the image requesting department as the search condition to be actually used, and pre-fetches an image found out during the search process.

As a matter of course, it is also possible to use the name of the image requesting doctor or the period in which the image was photographed in the past-image acquisition conditions or the past-image search conditions, though those items are not used in the present embodiment.

Now, a further embodiment of the present invention will be described with reference to FIGS. 5 and 6. This embodiment realizes a past-image delivering function, i.e. the function of delivering the pre-fetched past image to a predetermined delivery destination, in addition to the past-image pre-fetch function as described above. Although the items related to the pre-fetching of the past image are not shown in FIGS. 5 and 6 and the explanation for such items will not be repeated in the following, the present embodiment is capable of practicing the pre-fetching substantially in the same manner as the preceding embodiment does.

Figure 5:
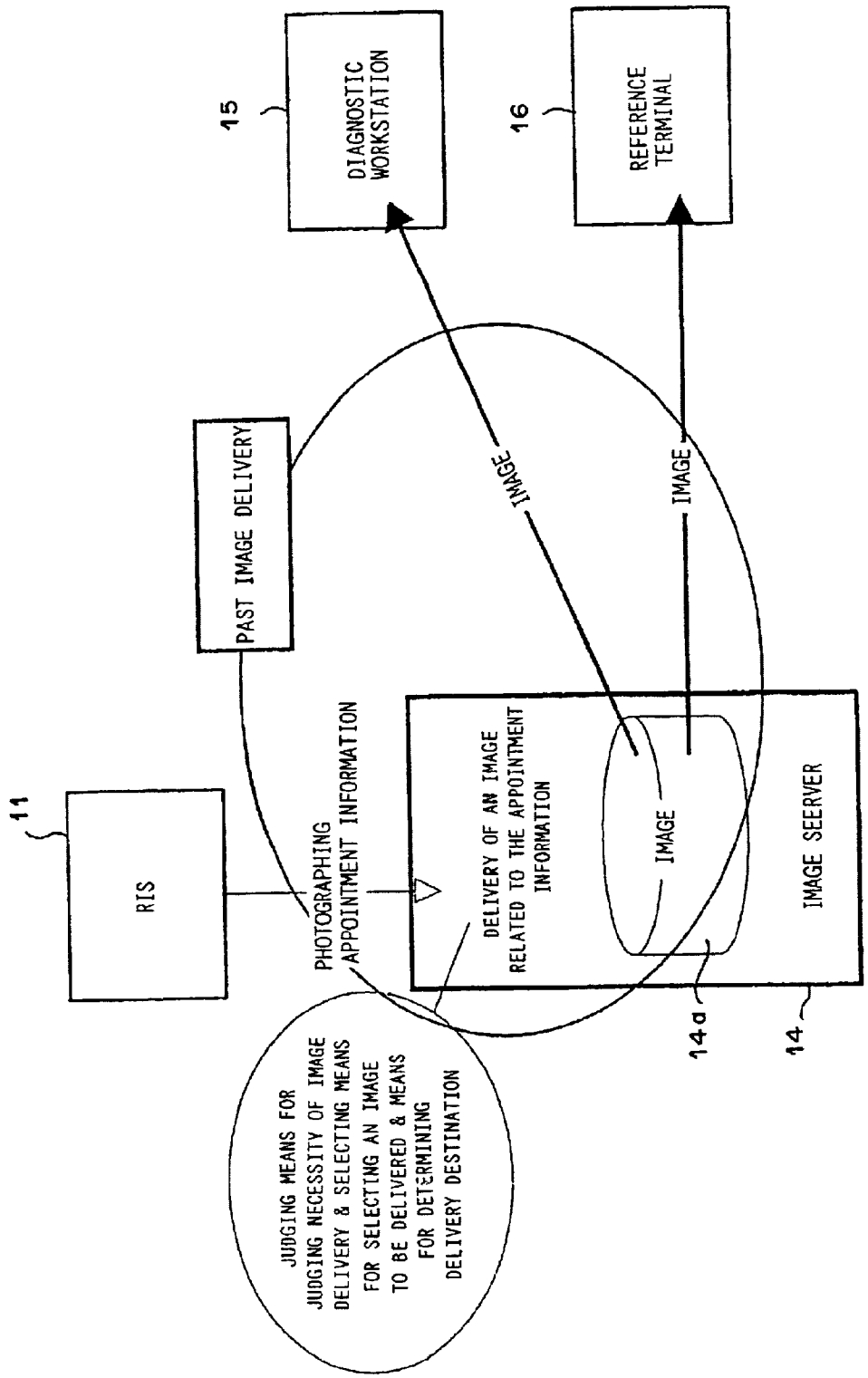
FIG. 5 is a diagram schematically showing a structure and functions of an image display system employing the medical image server according to a further embodiment of the present invention.

FIG. 5 schematically illustrates the structure and the function of an image display system utilizing the medical image server of the present embodiment. The past-image delivering function of the present embodiment is added by extending the function of the image server 14, and the overall structure of the image display system of the present embodiment is the same as the structure shown in FIG. 1.

As shown in FIG. 5, the image server 14 contains delivery judging means which judges whether delivery of an image recorded in a hard disc 14a is necessary or unnecessary based on examination order information (photographing appointment information) sent by a radiology department information system (RIS) 11, means for selecting an image to be delivered which selects an image from past images of a patient recorded in the hard disc 14a based on the examination order information when the delivery judging means judges the delivery of the image to be necessary and which causes the selected image to be delivered via a network 10 (see FIG. 1), and means for determining a past-image delivery destination which determines the delivery destination of the selected image based on the examination order information.

Figure 6:
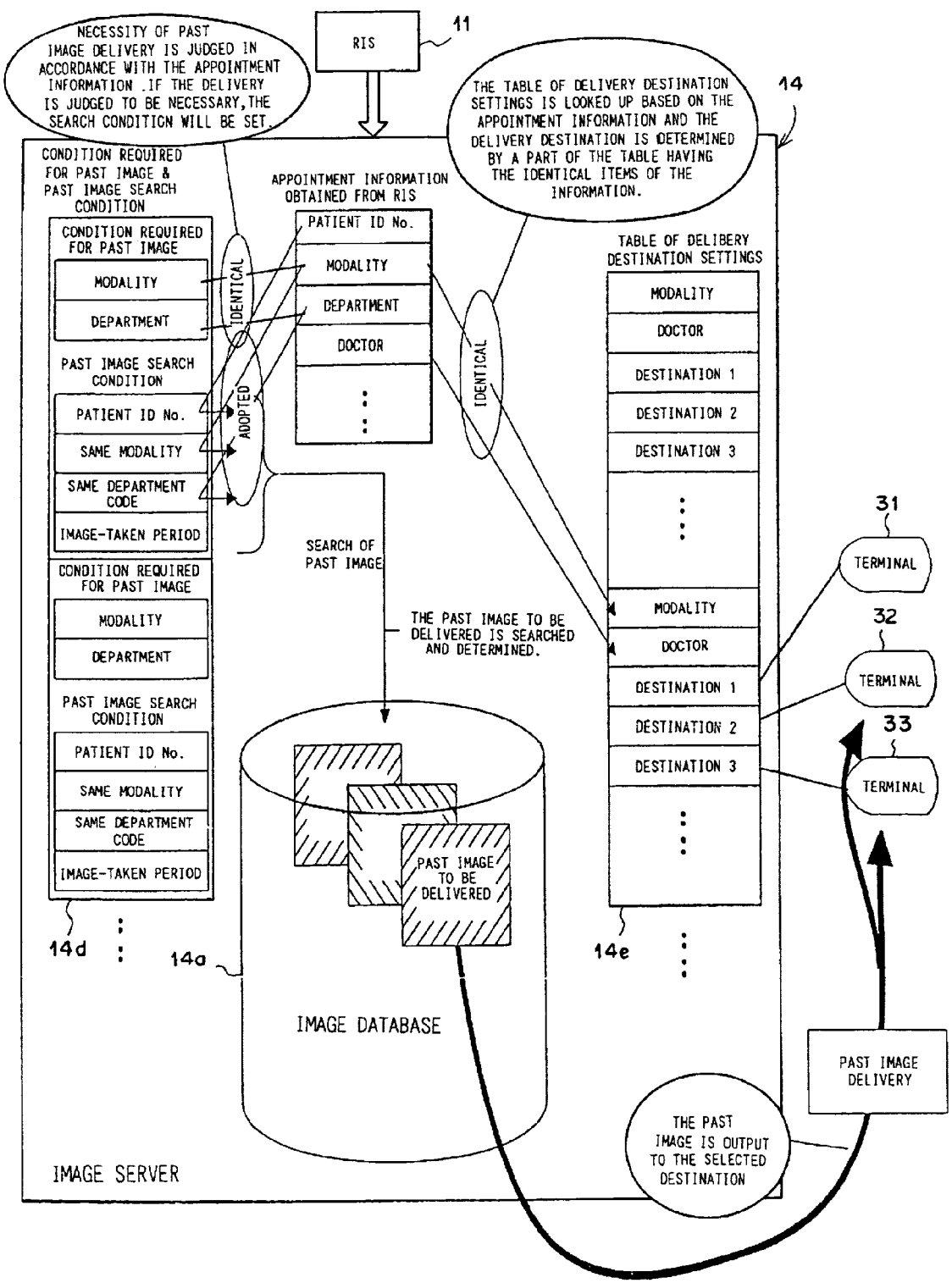
FIG. 6 is a diagram illustrating a process of delivering a past image carried out in the medical image server shown in FIG. 5.

FIG. 6 schematically illustrates the process of delivering the past image according to the present embodiment. The following teachings are supposed to be read along with FIG. 6. In the present embodiment, the image server 14 presets the combinations of the image recording modality and the image requesting department as the past-image delivery conditions and presets the combinations of an ID number of the patient, the modality, the image requesting department and the period in which the image was photographed as the past-image search conditions. Each of the past-image delivery conditions is associated with one of the past-image search conditions, and the associated pairs are recorded in the form of a reference table 14d. There are a plurality of such associated pairs set in the reference table 14d.

A radiology department information system (RIS) 11 sends examination order information (photographing appointment information) of a patient to the image server 14. The examination order information for each patient includes several items such as the ID number, the modality, the name of the image requesting department and the name of the image requesting doctor associated with the patient.

The image server 14 judges whether or not the combination of the modality and the image requesting department contained in the information sent by the radiology department information system (RIS) 11 is identical to one of those combinations which have been set as the past-image delivery condition. In the case where the image server 14 finds out the identical combination, one of the items constituting the past-image search condition set in association with the past-image delivery condition, i.e. one of the ID number, the modality and the name of the image requesting department each identical to the respective item contained in the information sent by the radiology department information system (RIS) 11, is selected as a search condition to be actually used.

The image server 14 searches through those images stored in the hard disc 14a based on the search condition after selecting one of the ID number, the modality and the name of the image requesting department as the search condition to be actually used, and delivers an image found out during the search process to a delivery destination determined in the manner to be described below.

Now, the process of determining the delivery destination will be described. In the present embodiment, the image server 14 contains storing means in which several combinations of the image recording modality and the name of the image requesting doctor and several sets of three delivery destinations each associated with one of the combinations are stored in the form of a reference table 14e. The three delivery destinations, namely delivery destinations 1, 2 and 3, correspond to terminals 31, 32 and 33, respectively, in which each of the terminals 31, 32 and 33 is provided with an image display function. Each of the terminals 31, 32 and 33 is a terminal similar to the diagnostic workstation 15 and the reference terminal 16 of FIG. 1.

The image server 14 looks up the modality and the name of the image requesting doctor contained in the information sent by the radiology department information system (RIS), reads the delivery destinations recorded in the reference table 14e in association with the above modality and the name of the image requesting doctor, and specifies the above delivery destinations as actual delivery destinations. The past image obtained by searching through the hard disc 14a is delivered to the delivery destinations determined in the manner described above.

As a matter of course, it is also possible to use the name of the image requesting doctor or the period in which the image was photographed in the past-image delivery conditions or the past-image search conditions, or to use the name of the image requesting department in the conditions for determining the past-image delivery destination, though those items are not used in the present embodiment.

Now, a further embodiment of the present invention will be described with reference to FIGS. 7 and 8. This embodiment realizes a function of delivering an image taken on the day, i.e. the function of delivering an image taken and recorded on the day to a predetermined destination, in addition to the past-image pre-fetch function as described above. Although the items related to the pre-fetching of the past image are not shown in FIGS. 7 and 8 and the explanation for such items will not be repeated in the following, the present embodiment is capable of practicing the pre-fetching substantially in the same manner as the above embodiments do.

Figure 7:
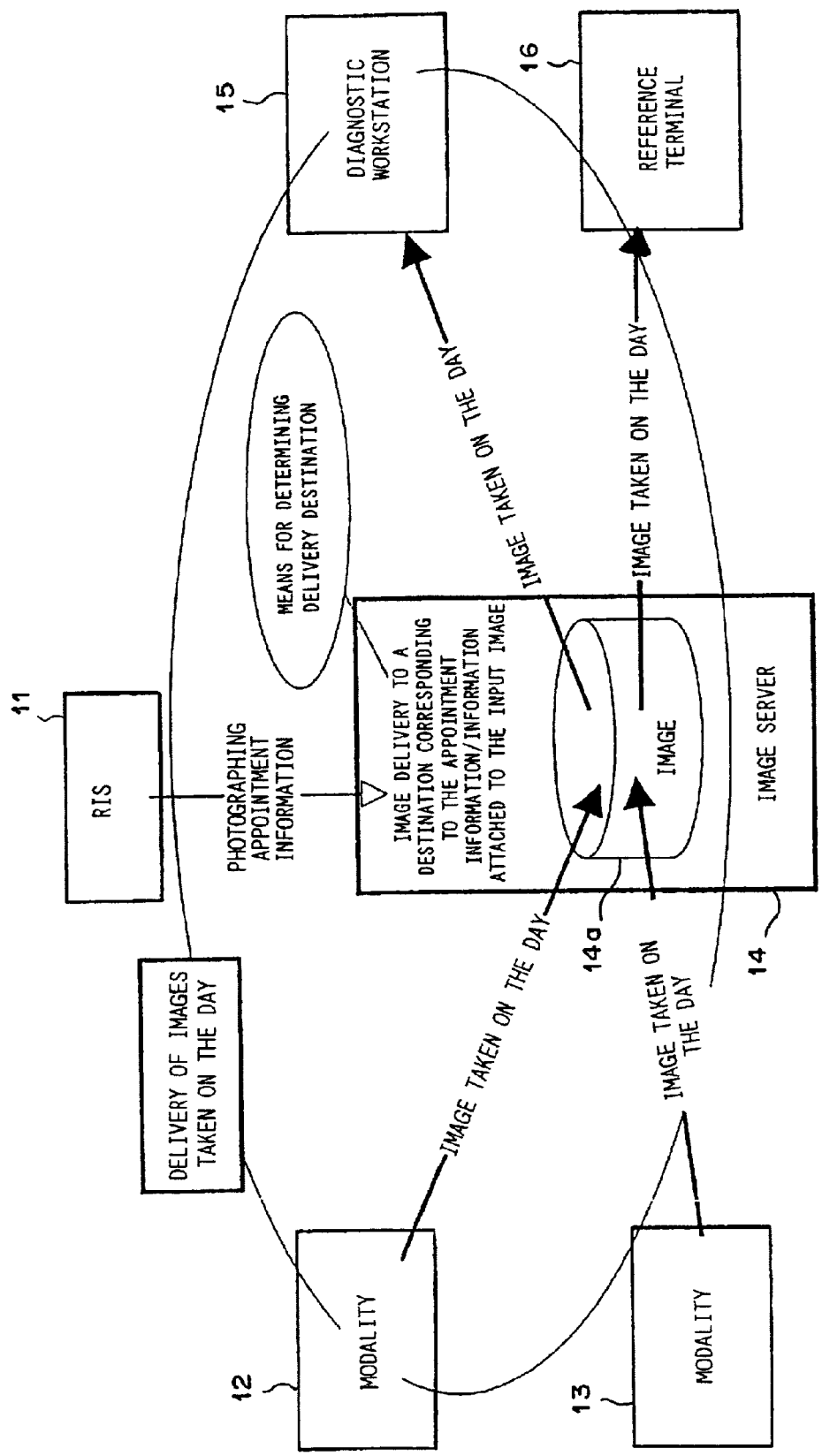
FIG. 7 is a diagram schematically showing a structure and functions of an image display system employing the medical image server according to a further embodiment of the present invention.

FIG. 7 schematically illustrates the structure and the function of an image display system utilizing the medical image server of the present embodiment. The function of delivering the image taken on the day realized in the present embodiment is added by extending the function of the image server 14, and the overall structure of the image display system of the present embodiment is the same as the structure shown in FIG. 1.

The image server 14 in FIG. 7 contains means for determining a delivery destination of the image taken on the day which determines the delivery destination of the image taken and recorded by an image recording modality 12 or 13 based on examination order information (photographing appointment information) sent by a radiology department information system (RIS) 11. In the present example, the image server 14 also contains means for delivering the image taken on the day.

Figure 8:
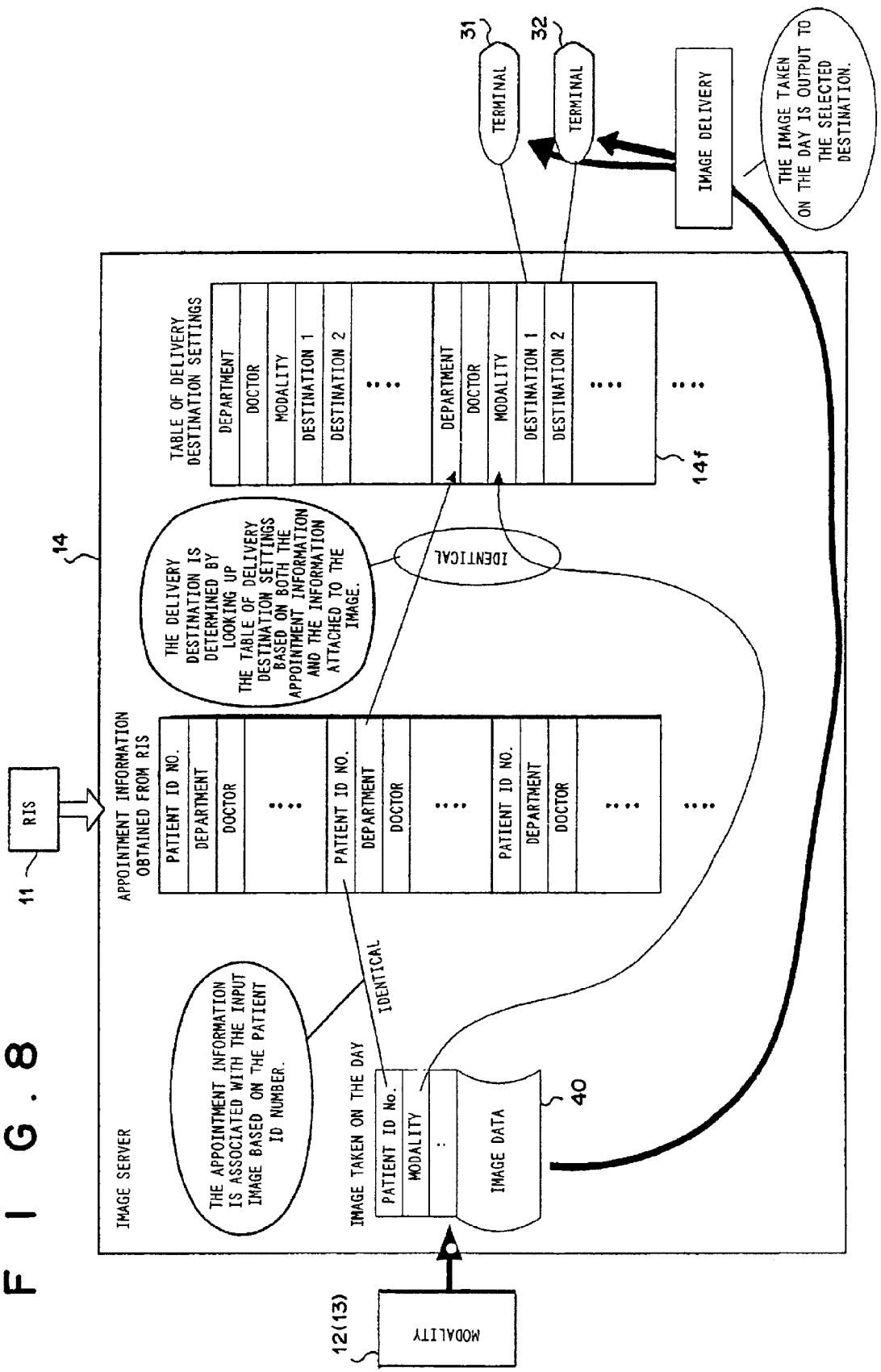
FIG. 8 is a diagram illustrating a process of delivering an image taken on the day, which is carried out in the medical image server shown in FIG. 7.

FIG. 8 schematically illustrates the process of delivering the image taken on the day according to the present embodiment. The following teachings are supposed to be read along with FIG. 8. In the present embodiment, the image server 14 contains storing means in which several combinations of the name of the image requesting department, the name of the image requesting doctor and the image recording modality and several sets of two delivery destinations each associated with one of the combinations are stored in the form of a reference table 14f. The two delivery destinations, namely delivery destinations 1 and 2, correspond to terminals 31 and 32, respectively, in which each of the terminals 31 and 32 is provided with an image display function. Each of the terminals 31 and 32 is a terminal similar to the diagnostic workstation 15 and the reference terminal 16 of FIG. 1.

A radiology department information system (RIS) 11 sends examination order information (photographing appointment information) of each patient to the image server 14. The examination order information for each patient includes several items such as the ID number, the name of the image requesting department and the name of the image requesting doctor associated with the patient.

The image server 14 compares the patient ID number associated with image data 40 sent from the image recording modality 12 or 13 with the patient ID number contained in the information of the patient sent from the radiology department information system (RIS), and determines a delivery destination of the image data 40 (i.e. the delivery destination of the image) in the case where the two patient ID numbers are identical to each other.

The image server 14 determines the delivery destination of the image by looking up the name of the image requesting department associated with the above identical patient ID number which is contained in the information of the patient, reading a delivery destination on the reference table 14f, the delivery destination which is recorded in association with the above image requesting department and with the image recording modality of the image data 40, and specifying the above delivery destination as the actual delivery destination. Then, the image server 14 delivers the image data 40 to the delivery destination determined as described above.

The above function of delivering the image taken on the day may be provided in parallel with the past-image delivering function, which was already explained along with the embodiment of FIGS. 5 and 6. In that case, the reference table for determining the delivery destinations of the past images (the reference table 14e in FIG. 6) and the reference table for determining the delivery destinations of the images taken on the day (the reference table 14f in FIG. 8) may be merged into a single table of a single setting, so that the merged table may be used for determining the delivery destination for both the past images and the images taken on the day.

In the present embodiment, the means for determining the delivery destination of the image taken on the day contained in the image server 14 determines the delivery destination based on both patient identifying information (the patient ID number) associated with the examination order information and patient identifying information (the patient ID number) associated with the image taken on the day, referring to the reference table 14*f* in which the predetermined delivery destination is set for each combination of a plurality of items of the examination order and/or photographing information (e.g. the name of the image requesting department, the name of the image requesting doctor and the image recording modality). However, examination identifying information may also be used in place of the above patient identifying information. Moreover, it is possible to use the patient identifying information and the examination identifying information in parallel.

The above-described methods for determining the image delivery destination may also be adopted to the delivery of the past images which was already explained along with FIGS. 5 and 6.

In addition, the delivery of the past image may be carried out using the delivery judging means configured to judge whether the delivery of the past image is necessary or unnecessary based on a judging standard which is one of or any combination of the name of the image requesting department, the name of the image requesting doctor, the image recording modality and the photographing menu, which are contained in the information from RIS (Radiology department Information System) and/or the information attached to the image taken on the day, by comparing the judging standard with a preset condition required for the past image to be acquired which is defined by one of or any combination of the name of the image requesting department, the name of the image requesting doctor, the image recording modality and the photographing menu.

Instead, the delivery of the past image may be carried out using the means for selecting the image to be delivered configured to select the past image based on a selection standard which is one of or any combination of the name of the image requesting department, the name of the image requesting doctor, the image recording modality and the photographing menu, which are contained in the information from RIS (Radiology department Information System) and/or the information attached to the image taken on the day, by comparing the selection standard with a preset selection condition preset for each of the conditions required for the past image to be acquired, wherein the selection condition is defined by one of or any combination of the name of the image requesting department, the name of the image requesting doctor, the image recording modality and the photographing menu.

On the other hand, the pre-fetching of the past image may be carried out using the pre-fetching judging means configured to judge the necessity of the pre-fetching based on a judging standard which is one of or any combination of the name of the image requesting department, the name of the image requesting doctor, the image recording modality and the photographing menu, which are contained in the information from RIS (Radiology department Information System) and/or the information attached to the image taken on the day, by comparing the judging standard with a preset condition required for the past image to be acquired which is defined by one of or any combination of the name of the image requesting department, the name of the image requesting doctor, the image recording modality and the photographing menu.

In addition, the pre-fetching of the past image may be carried out using the pre-fetching image selecting means configured to select the past image based on a selection standard which is one of or any combination of the name of the image requesting department, the name of the image requesting doctor, the image recording modality and the photographing menu, which are contained in the information from RIS (Radiology department Information System) and/or the information attached to the image taken on the day, by comparing the selection standard with a preset selection condition preset for each of the conditions required for the past image to be acquired, wherein the selection condition is defined by one of or any combination of the name of the image requesting department, the name of the image requesting doctor, the image recording modality and the photographing menu.

Figure 9:
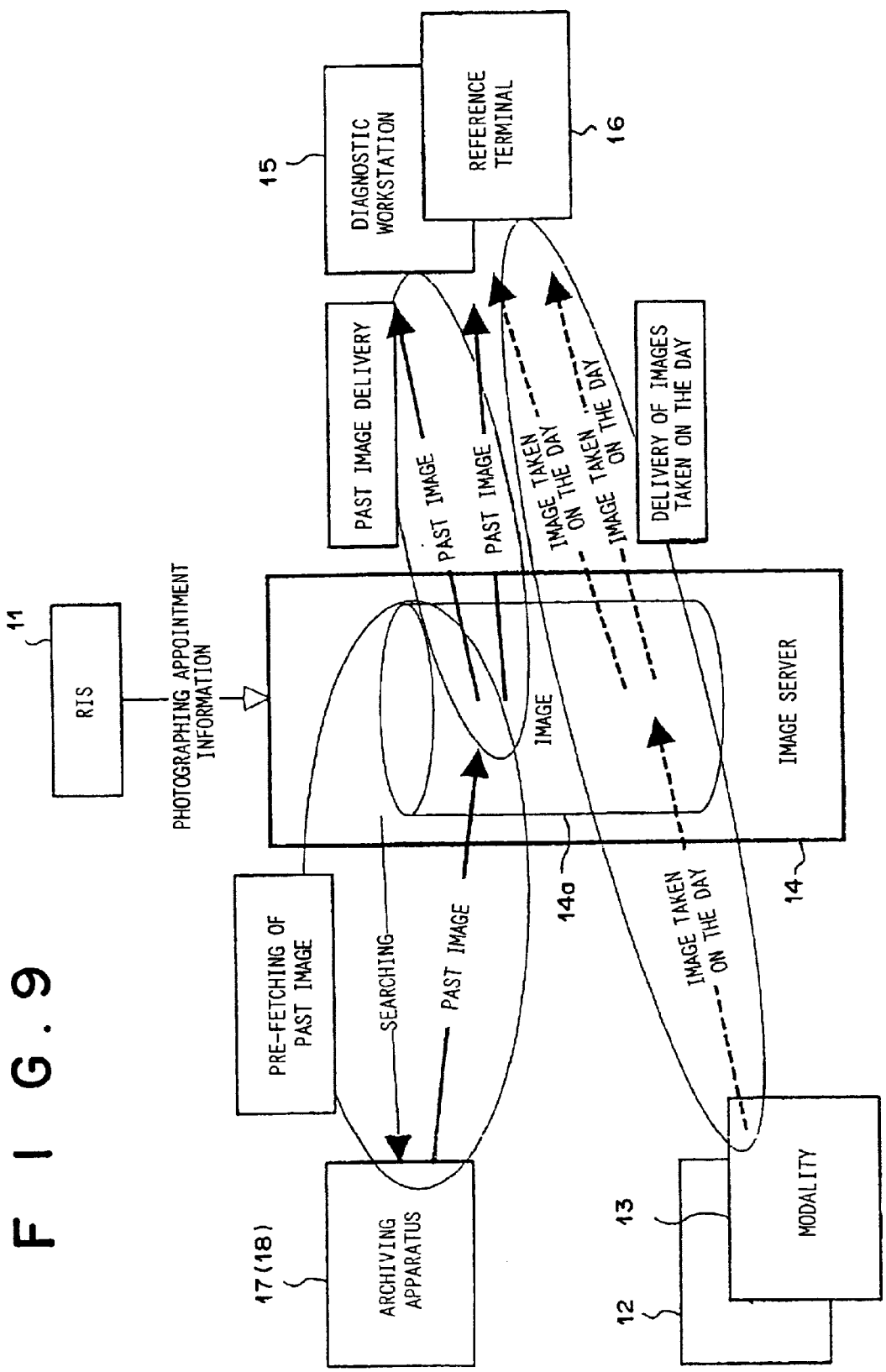
FIG. 9 is a diagram schematically showing a structure and functions of an image display system employing the medical image server according to a further embodiment of the present invention.

Another embodiment of the present invention will now be described along with FIG. 9. FIG. 9 schematically illustrates the structure and the function of an image display system utilizing the medical image server of the present embodiment. The present embodiment is provided with the past-image delivery function for delivering the pre-fetched past image to a predetermined delivery destination and the function for delivering the image taken and recorded on the day to a predetermined destination, in addition to the past-image pre-fetch function which was already described.

In the present embodiment, the past images are delivered substantially in the same manner as the embodiment explained along with FIGS. 5 and 6, and the images taken and recorded on the day are delivered substantially in the same manner as the embodiment explained along with FIGS. 7 and 8.

Figure 10:
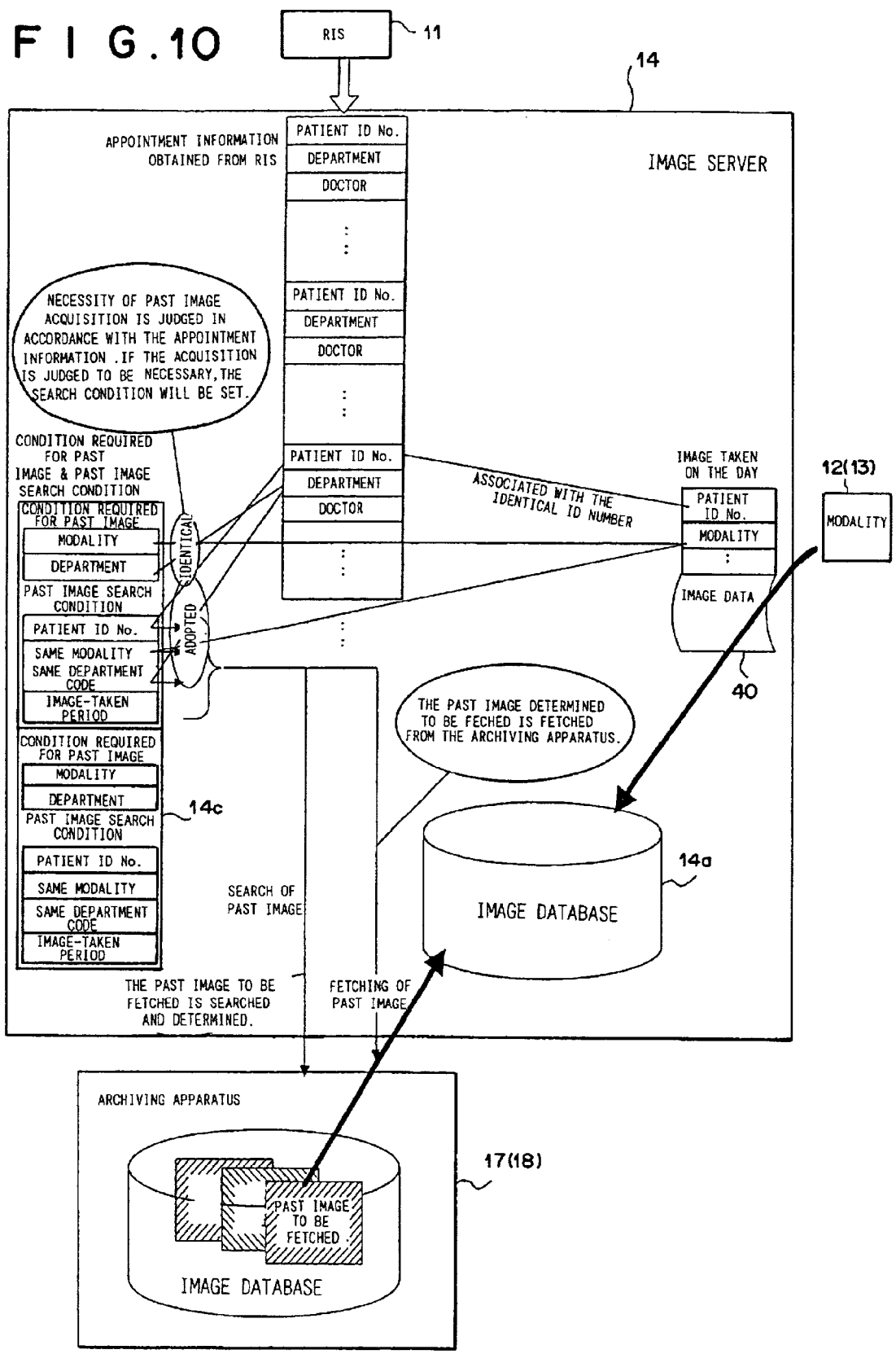
FIG. 10 is a diagram illustrating a process of pre-fetching a past image carried out in the medical image server according to a further embodiment of the present invention.

Now, another embodiment of the present invention will be explained referring to FIG. 10. FIG. 10 schematically illustrates a pre-fetching process according to the present embodiment. An overall structure of an image display system for carrying out the pre-fetching process is basically the same as the structure shown in FIG. 1. In the present embodiment, conditions different from those described above are used for judging the necessity of the pre-fetching and for specifying the setting of the selection range of the pre-fetched image.

In the present embodiment, an image server 14 presets the combinations of the image recording modality and the name of the image requesting department as the past-image acquisition conditions (the condition required for an past image to be pre-fetched) and presets the combinations of an ID number of the patient, the modality, the name of the image requesting department and the period in which the image was photographed as the past-image search conditions. Each of the past-image acquisition conditions is associated with one of the past-image search conditions, and the associated pairs are recorded in the form of a reference table 14*c*. There are a plurality of such associated pairs set in the reference table 14*c*.

A radiology department information system (RIS) 11 sends examination order information (photographing appointment information) of a patient to the image server 14. The items included in the examination order information for each patient are the patient ID number, the name of the image requesting department and the name of the image requesting doctor associated with the patient.

The image server 14 receives image data 40 related to the images (images taken on the day) taken and recorded by image recording modalities 12 and 13, and stores the image data 40 in a hard disc 14a. The image data 40 contains the information telling the patient ID number and the image recording modality.

When receiving the image data 40, the image server 14 compares the patient ID number associated with image data 40 with the patient ID number contained in the examination order information of the patient sent from the radiology department information system (RIS) 11. In the case where the two patient ID numbers are identical to each other, the image server 14 adopts the examination order information having that patient ID number as a standard for judging the necessity of the pre-fetching and as a standard for selecting the pre-fetched image.

Also, the examination identifying information contained in the examination order information may be used in place of the patient identifying information, e.g. the patient ID number, to realize the same function.

The image server 14 looks over the names of the image requesting departments set in the reference table 14c as the past-image acquisition conditions, examines whether the name of the image requesting department identical with the name contained in the examination order information, which is adopted as the judgment standard and the selection standard, is recorded in the reference table 14c, and judges the pre-fetching to be necessary if the identical name was found.

The image server 14 then selects a search condition to be actually used from the past-image search conditions set in association with the past-image acquisition conditions including the name of the image requesting department, namely from the name of the image requesting department and the name of the image requesting doctor contained in the examination order information adopted as the selection standard. The image server 14 searches through the images stored in archiving apparatuses 17 or 18 according to the selected search condition, i.e. the name of the image requesting department or the name of the image requesting doctor, and pre-fetches an appropriate image.

Accordingly, a series of items of the examination order information corresponding to the input image can be picked up correctly out of a plurality of items of the examination order information, each associated with a single patient.

The above-described method of handling the images, which utilizes the patient identifying information (e.g. the patient ID number) associated with the image data 40 and the patient identifying information (e.g. the patient ID number) contained in the examination order information for each patient which is sent from the radiology department information system (RIS), may be used not only for judging the necessity of the pre-fetching or for determining the selection range of the pre-fetched images but also for judging the necessity of the past-image delivery, for determining the past-image delivery destination, or for determining the delivery destination of the image taken on the day.

The workstation such as the diagnostic workstation 15 in the image display system shown in FIG. 3, 5, 7 or 9 preferably comprises the display means capable of displaying the image stored in the workstation, the judging means for judging whether or not an image need to be displayed is stored in the workstation, and the means for sending to the medical server 14 the order for output of the image need to be displayed when the judging means judges that the image is not stored in the workstation. In that case, the medical server 14 is preferably configured to judge whether or not the image specified by the order for output is stored in the hard disc 14a when receiving the order for output from the workstation, to deliver the image therein to the workstation if the image was stored in the hard disc 14a, and to deliver the image to the workstation after fetching the image from the image archiving apparatus 17 or 18 if the image was not stored in the hard disc 14a.

The medical image need to be displayed may be picked up for display immediately and efficiently by the workstation and the medical server 14 having the above structures.

Figure 11:
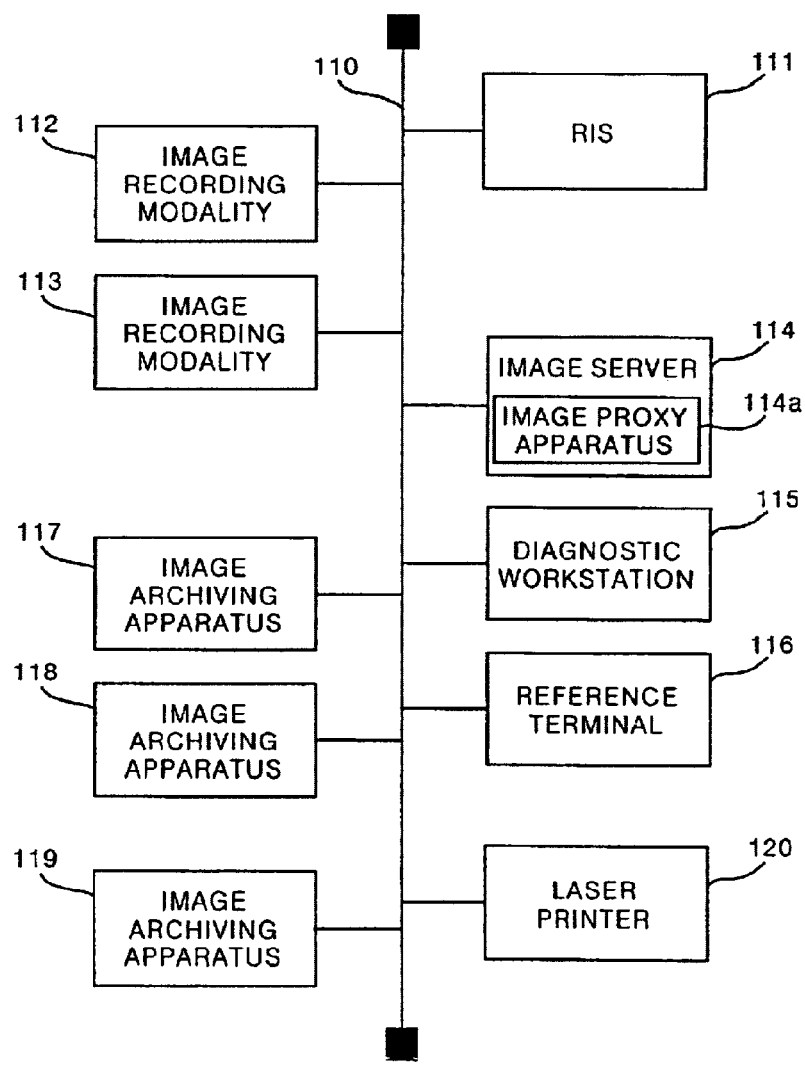
FIG. 11 is a diagram showing an outline of a medical network system including a medical image search apparatus according to another embodiment of the present invention.

A further embodiment of the present invention will now be explained with reference to FIGS. 11 and 12. FIG. 11 is a diagram showing a medical network system including a medical image search apparatus according to the present embodiment of the present invention.

In the system shown in FIG. 11, a network 110 is a local area network (LAN), such as the Ethernet or an FDDI, installed in a hospital. The network may be connected to the Internet via a dedicated line or a public telecommunication line such as ISDN.

A radiology department information system (RIS) 111, image recording modalities 112 and 113, an image server 114 as a medical image search apparatus, a diagnostic workstation 115 which is a terminal, a reference terminal 116, image archiving apparatuses 117, 118 and 119, a laser printer 120, and the like are connected to the network 110.

The image recording modalities 112 and 113 are apparatuses or systems for CT, MRI, CR, RI, US and the like for recording images of patients as digital data. The image recording modalities may record image signals obtained by photographing after conversion of the analog signal into digital data or obtain digital data by reading images of patients recorded on a film or the like upon photographing.

The radiology department information system 111 is connected to terminals not shown in FIG. 11 and placed in a radiology department or other medical departments such as an internal department or a surgical ward requesting image recording from the radiology department, and the system carries out information transmission and processing based on examination order information (photographing order or the like pertaining to the radiology department) regarding patients from the requesting departments or on photographing information in the image recording modalities 112 and 113.

The image server 114 comprises a computer system and stores image data recorded by the image recording modalities 112 and 113 together with text information showing the name of a patient and the like in the image archiving apparatus 117, 118 or 119 to compile a database for each archiving apparatus. The image server 114 searches for and reads desired image data from the database, based on search information from the diagnostic workstation 115 or from the reference terminal 116, to transfer the image data and the text information thereto. The image data recorded by the image recording modalities 112 and 113 may be stored directly in the image archiving apparatuses 117, 118 or 119, instead of via the image server 114.

The diagnostic workstation 115 is a terminal used by a radiologist or the like for carrying out a diagnosis while referring to image data and carrying out image processing to generate an image appropriate for diagnosis by changing an image processing parameter and the like upon necessity.

The reference terminal 116 is a terminal only for referring to image data. The laser printer 120 outputs processed image data as a visible image. Image output by the laser printer 120 is executed by an instruction from the diagnostic workstation 115 to the image server 114.

In order to input or display text information, the workstation 115 uses the Japanese syllabary while the reference terminal 116 uses the Roman alphabet. Meanwhile, in order to show text information in the database, the archiving apparatuses 117 and 118 use the Japanese syllabary and the Roman alphabet respectively, while the archiving apparatus 119 uses either the Japanese syllabary or the Roman alphabet depending on each image.

In the case where the character types used are not unique as been described above, image search can be carried out thoroughly. This mechanism will be explained below. The image server 114 includes an image proxy apparatus 114a and the image proxy apparatus 114a has a function to carry out protocol conversion between the two terminals, that is, the workstation 115 and the reference terminal 116, and the databases compiled in the archiving apparatuses 117, 118, and 119. The protocol conversion includes character type conversion between the Japanese syllabary and the Roman alphabet.

FIG. 12 illustrates this concept of character type conversion. As shown in FIG. 12, when the proxy apparatus 114a receives search information from the diagnostic work station 115 using the Japanese syllabary, the proxy apparatus 114a searches the databases of the archiving apparatuses 117, 118, and 119 based on the search information in the Japanese syllabary, in the Roman alphabet converted from the Japanese syllabary, and in the Japanese syllabary as well as the Roman alphabet converted from the Japanese syllabary, respectively.

The image proxy apparatus 114a sends to the diagnostic workstation 115 a search result including the text information in the Japanese syllabary obtained from the archiving apparatus 117 or 119, or a search result obtained from the archiving apparatus 118 or 119 after conversion of the result from the Roman alphabet into the Japanese syllabary.

Meanwhile, when the proxy apparatus 114a receives search information from the reference terminal 116 using the Roman alphabet, the proxy apparatus 114a searches the databases of the archiving apparatuses 117, 118, and 119 based on the search information in the Japanese syllabary converted from the Roman alphabet, in the Roman alphabet and in the Roman alphabet as well as the Japanese syllabary converted from the Roman alphabet, respectively.

The image proxy apparatus 114a sends to the reference terminal 116 a search result including the text information in the Roman alphabet obtained from the archiving apparatus 118 or 119, or a search result obtained from the archiving apparatus 117 or 119 after conversion of the result from the Japanese syllabary into the Roman alphabet.

In this manner, in the case where a search request is received from either the diagnostic workstation 115 or the reference terminal 116, the databases of the archiving apparatuses 117, 118 and 119 can be searched thoroughly, and the search result can be noticed to the diagnostic workstation 115 or the reference terminal 116 having requested the search.

The character type conversion in the present invention is not limited to conversion between the Japanese syllabary and the Roman alphabet, and it is needless to say that conversion in accordance with character types used by the search requesting terminal and the databases is carried out.

Figure 13:
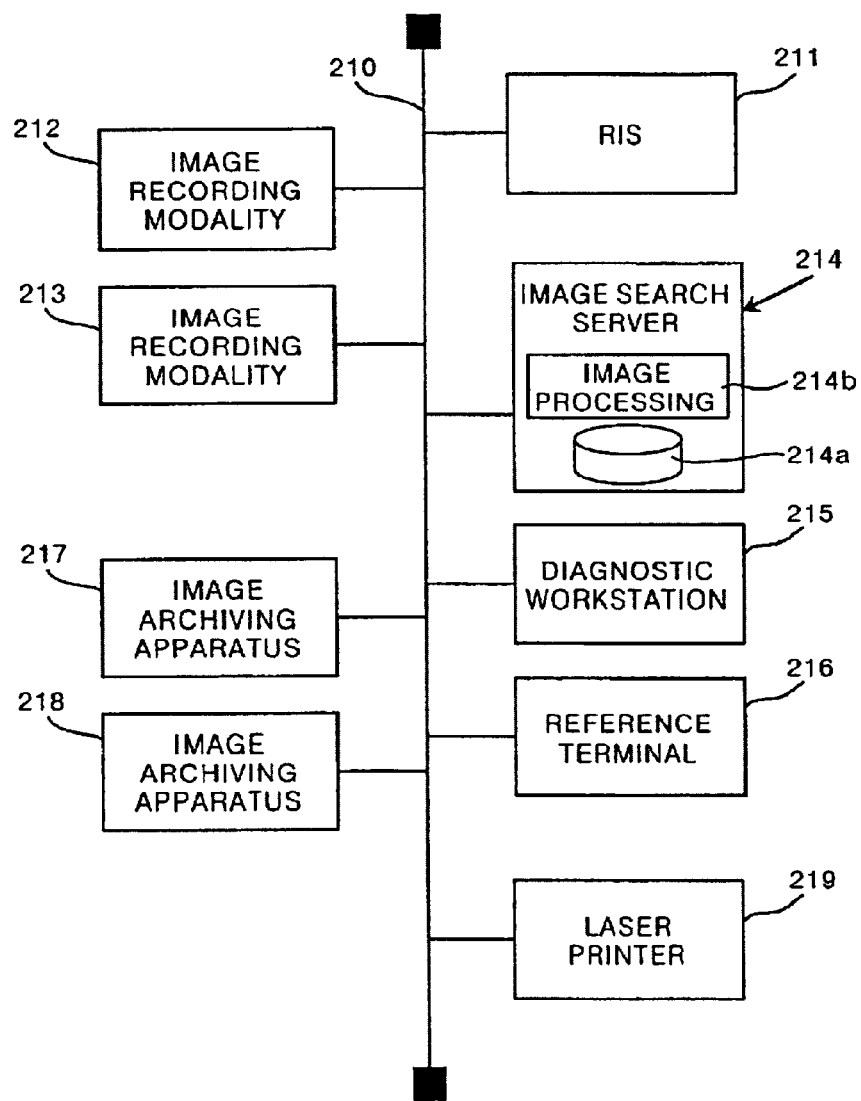
FIG. 13 is a diagram showing an outline of a medical network system including an image search server according to another embodiment of the present invention.
Figure 14:
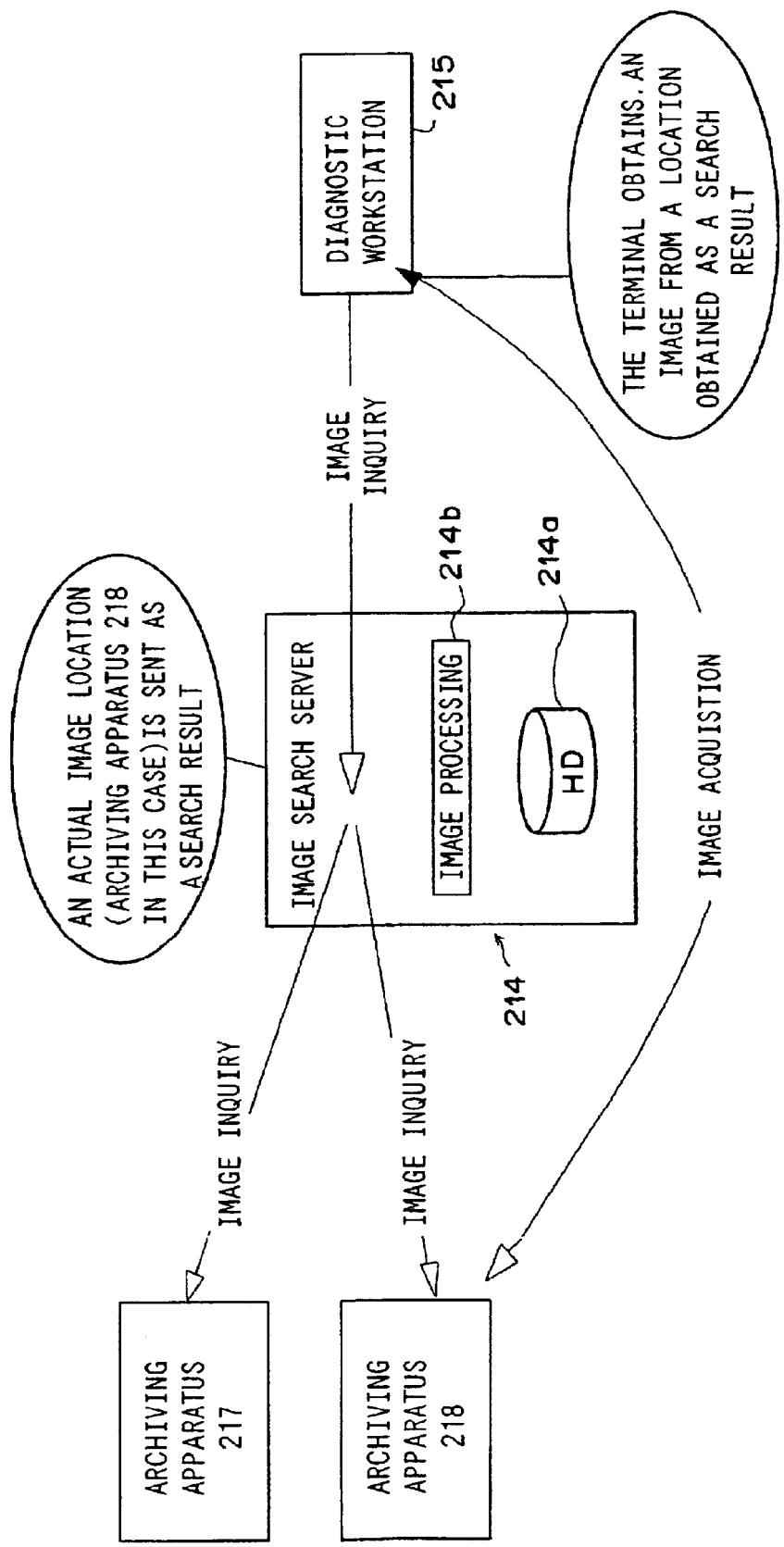
FIG. 14 is a diagram illustrating a process carried out by the image search server shown in FIG. 13 in the case where image processing is unnecessary.
Figure 15:
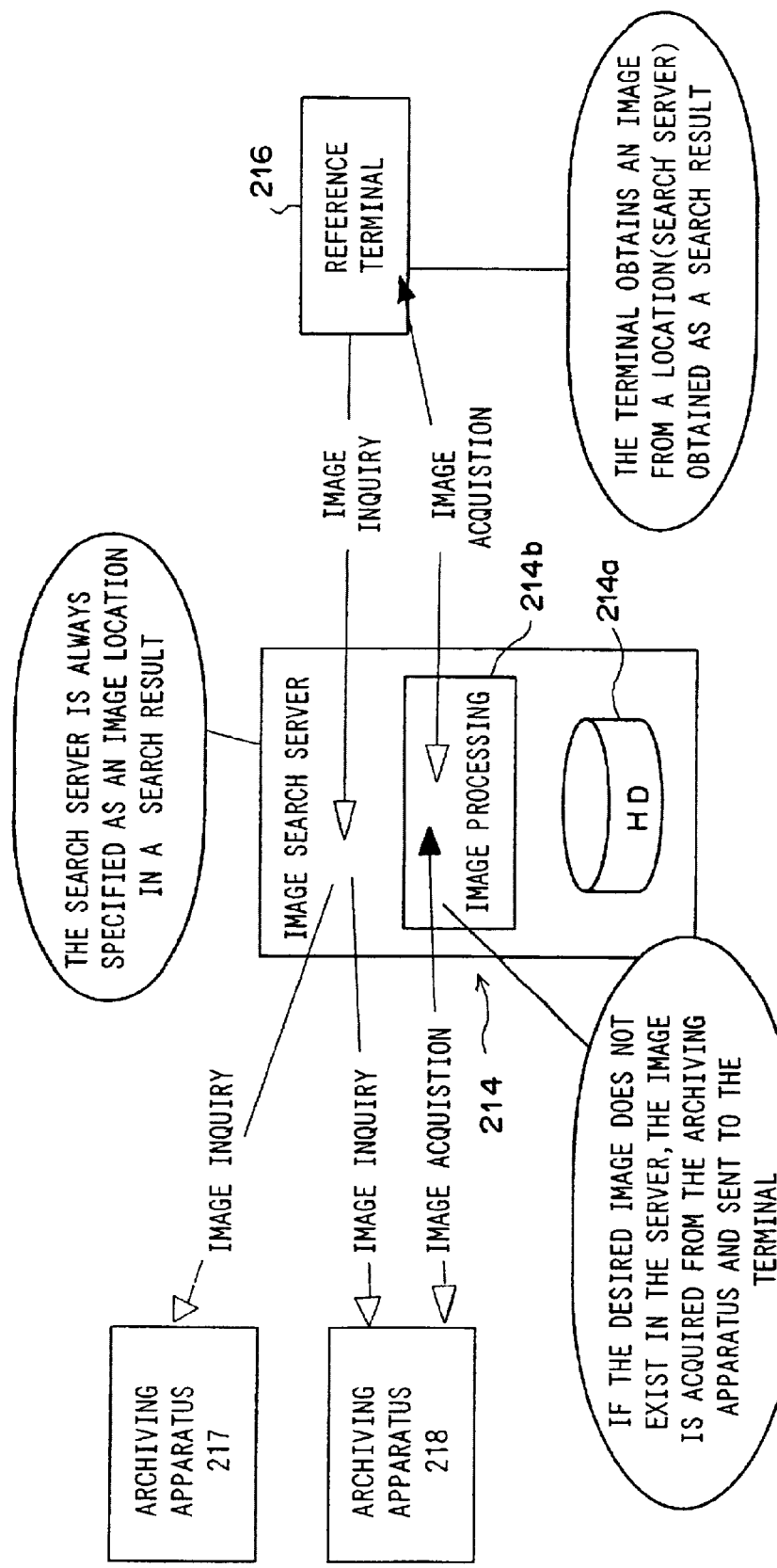
FIG. 15 is a diagram illustrating a process carried out by the image search server shown in FIG. 13 in the case where image processing is necessary.

FIGS. 13, 14 and 15 show a medical network system including an image search server according to another embodiment of the present invention.

In the system shown in FIG. 13, a network 210 is a local area network (LAN) installed in a hospital, such as the Ethernet or an FDDI. The network may be connected to the Internet via a dedicated line or a public telecommunication line such as ISDN.

A radiology department information system (RIS) 211, image recording modalities 212 and 213, an image search server 214, a diagnostic workstation 215 which is a terminal, a reference terminal 216, image archiving apparatuses 217 and 218, a laser printer 219, and the like are connected to the network 210.

The image recording modalities 212 and 213 are apparatuses or systems for CT, MRI, CR, RI, US and the like for recording images of patients as digital data. The image recording modalities may record image signals obtained by photographing after conversion of the analog signal into digital data or obtain digital data by reading images of patients recorded on a film or the like upon photographing.

The radiology department information system 211 is connected to terminals not shown in FIG. 13 and placed in a radiology department or other medical departments such as an internal department or a surgical ward requesting image recording from the radiology department, and the system carries out information transmission and processing based on examination order information (photographing order or the like pertaining to the radiology department) regarding patients from the requesting departments or on photographing information in the image recording modalities 212 and 213.

The image search server 214 comprises a computer system and stores image data recorded by the image recording modalities 212 and 213 together with text information showing the name of a patient and the like in the image archiving apparatus 217 or 218 to compile a database for each archiving apparatus. The image search server 214 searches for and reads desired image data from the database, based on a search request of the diagnostic workstation 215 or the reference terminal 216 to transfer a search result to the workstation or the reference terminal. The image search server 214 comprises a hard disc 214a for temporarily storing images and an image processing apparatus 214b.

The image data recorded by the image recording modalities 212 and 213 may be stored directly in the image archiving apparatus 217 or 218, instead of through the image server 214.

The diagnostic workstation 215 is a terminal used by a radiologist or the like for carrying out a diagnosis while referring to image data and carrying out image processing to generate an image appropriate for diagnosis by changing an image processing parameter and the like upon necessity.

The reference terminal 216 is a terminal only for referring to image data. The laser printer 219 outputs processed image data as a visible image. Image output by the laser printer 219 is executed by an instruction from the diagnostic workstation 215 to the image server 214.

Image search and image processing by the image search server 214 will be explained with reference to FIG. 14 and showing the outline thereof. The image search server 214 comprises judging means and control means. The judging means and the control means are included in the image search server 214 and judging processing and control processing is carried out based on a predetermined computer program.

The image search server 214 has setting defining that image processing is unnecessary for the diagnostic workstation 215 which is an image display terminal having an image processing function and defining that image processing is necessary for the reference terminal 216 which is an image display terminal not having an image processing function.

As shown in FIG. 14, when an image search is requested by the diagnostic workstation 215, the image search server 214 searches the databases of the archiving apparatus 217 and 218. Thereafter, the image search server 214 judges image processing to be unnecessary, and transfers to the diagnostic workstation 215 a search result including information indicating a location of the image in the database (in this example in FIG. 14, the archiving apparatus 218).

The diagnostic workstation 215 obtains the image directly from the archiving apparatus 218 based on the information having been received, and carries out image processing as required. In this manner, an image can promptly reach the diagnostic workstation, since pointless image transfer of the image to the image search server 214 is omitted.

Meanwhile, as shown in FIG. 15, when the reference terminal 216 requests an image search, the image search server 214 searches the databases of the archiving apparatus 217 and 218. Thereafter, the image search server 214 transfers to the reference terminal 216 a search result including information indicating that the image is located in the hard disc 214a of the image search server 214. In the meantime, the image search server 214 judges image processing to be necessary, and obtains the image from the database of the archiving apparatus 217 or 218. After the image processing apparatus 214b carries out predetermined image processing on the image having been obtained, the processed image is stored in the hard disc 214a.

The reference terminal 216 obtains the image from the hard disc 214a based on the search result information having been received, and obtains the processed image. In this manner, the processed image having better diagnostic performance can be displayed on the reference terminal 216, although the reference terminal 216 does not have the image processing function.

In the embodiment described above, necessity or lack of necessity of image processing is judged based on whether the image display terminal is the workstation 215 or the reference terminal 216. However, this judgment may be based on which image recording modality 212 or 213 has recorded the image, for example.

The present invention is not limited to the image search server for medical images, and is also applicable to any image search server for any kind of images, and the same effect can be obtained.

Hereinafter, a further embodiment of the present invention will be explained with reference to FIGS. 1, 16 and 17. A medical network system including an image search server according to the present embodiment of the present invention may be explained referring to FIG. 1. For the explanation of the network 10, the radiology department information system 11, the medical network system, the DICOM standard, and the like, see the above explanation in the first embodiment.

The image recording modalities 12 and 13 are apparatuses or systems for CT, MRI, CR, RI, US and the like for recording images of patients as digital data. The image recording modalities may record image signals obtained by photographing after conversion of the analog signal into digital data, or obtain digital data by reading images of patients recorded on a film or the like upon photographing.

The radiology department information system 11 is connected to terminals not shown in FIG. 1 and placed in a radiology department or other medical departments such as an internal department or a surgical ward requesting image recording from the radiology department, and the system carries out information transmission and processing based on examination order information (photographing order or the like pertaining to the radiology department) regarding patients from the requesting departments or on photographing information in the image recording modalities 12 and 13.

The image search server 14 comprises a computer system and compiles a database for each of the image archiving apparatuses by storing image data recorded by the image recording modalities 12 and 13 in the image archiving apparatus 17 or 18 together with text information indicating the name of a patient and the like. The image data recorded by the image recording modalities 12 and 13 may be stored directly in the image archiving apparatus 17 or 18, instead of through the image search server 14.

The image search server 14 comprises the hard disc 14a for temporarily storing images. The image search server 14 searches the databases and the hard disc 14a therein for a desired image (the selection of where to search will be explained later) based on a search request of the workstation 15 or the reference terminal 16, and transfers a search result to the diagnostic workstation 15 or to the reference terminal 16.

The diagnostic workstation 15 is a terminal used by a radiologist or the like for carrying out a diagnosis while referring to image data and carrying out image processing to generate an image appropriate for diagnosis by changing an image processing parameter and the like as required.

Figure 16:
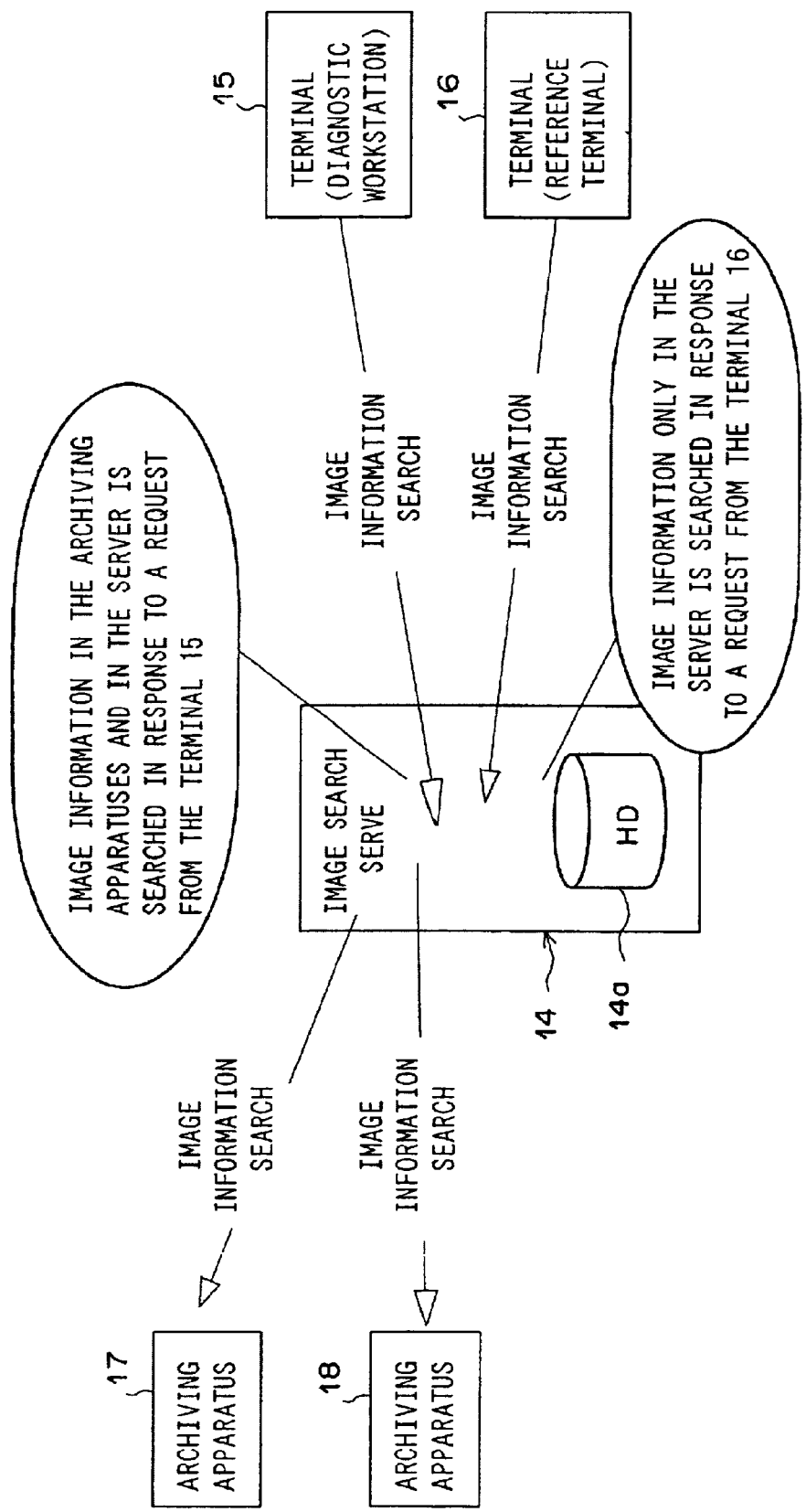
FIG. 16 is a diagram explaining selection of where the image search server shown in FIG. 1 searches.

Image search processing by the image search server 14 will be explained with reference to FIG. 16 showing an outline of the processing. The image search server 14 comprises the control means described above, and the control means is included in the image search server 14. Control processing is carried out according to a predetermined computer program.

Among images stored in the databases of the archiving apparatuses 17 and 18, the image search server 14 temporarily stores images of comparatively frequent use in the hard disc 14a thereof. The images to be stored temporarily in this manner can be selected according to the kind of the image recording modality 12 or 13 that photographed the images or based on a photographing menu.

The image search server 14 has setting defining that all of the databases (that is, the archiving apparatuses 17 and 18) and the hard disc 14a are searched in response to a search request of the diagnostic workstation 15 which is an image display terminal while only the hard disc 14a is searched in response to a search request of the reference terminal 16. The image search server 14 carries out a search according to this setting.

Upon receiving a search request from the diagnostic workstation 15, the image search server 14 searches the hard disc 14a and sends a search result to the diagnostic workstation 15. The image search server 14 then searches the databases in the archiving apparatuses 17 and 18 and sends a result to the diagnostic workstation 15. Meanwhile, if a search request is sent from the reference terminal 16 to the image search server 14, the image search server 14 searches only the hard disc 14a and sends a result to the reference terminal 16.

The reference terminal 16 is used to search for and display images of comparatively frequent use, and no problem occurs if the databases of the archiving apparatuses 17 and 18 are not searched in response to a search request of the terminal. By searching only the hard disc 14a and not searching the databases of the archiving apparatuses 17 and 18, an image search can be carried out promptly.

On the other hand, the diagnostic workstation 15 may request a search of an image stored in the databases. For such a search request, all of the databases of the archiving apparatuses 17 and 18 are searched as has been described above, and a thorough search can be realized.

Figure 17:
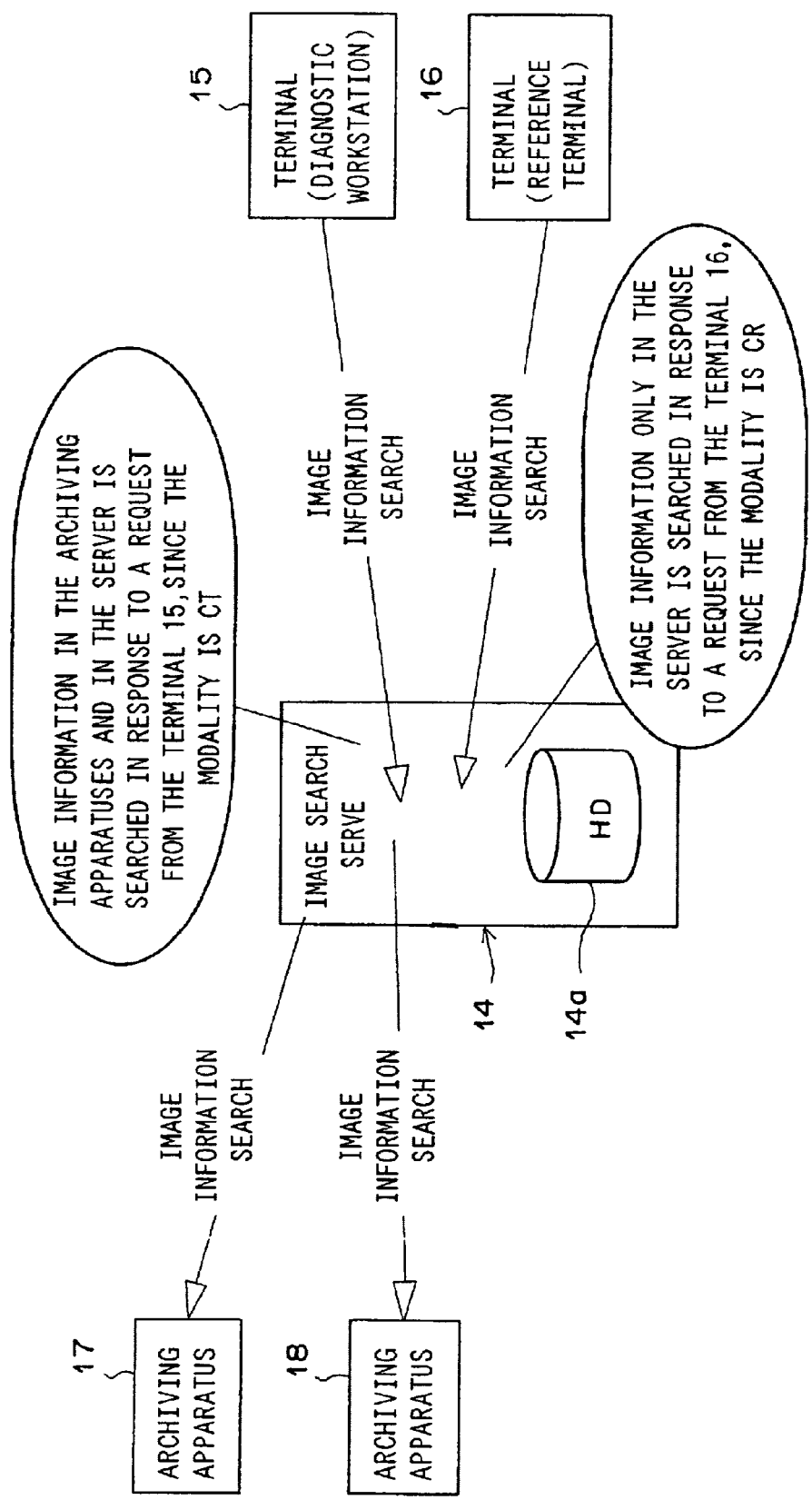
FIG. 17 is a diagram explaining selection of where another image search server of the present invention searches.

FIG. 17 explains how another image search server of the present invention selects where to search. In this case, an image search server 14 has setting defining that all the databases (that is, the archiving apparatuses 17 and 18) as well as a hard disc 14a therein, or only the hard disc 14a are searched, for each image recording modality such as a CT, MRI, or CR apparatus. The image search server 14 searches for an image based on the setting.

In the example shown in FIG. 17, when a search of an image recorded by a CT apparatus is requested by the diagnostic workstation 15, for example, the image search server 14 searches all the databases (that is, the archiving apparatuses 17 and 18) and the hard disc 14a, according to the setting. When the reference terminal 16 requests a search of an image recorded by a CR apparatus for example, the image search server 14 searches only the hard disc 14a, according to the setting.

In this case, an image search can be carried out thoroughly and promptly.

The present invention is applicable not only to the image search server for medical images but also any image search server for any kind of image, and the same effect can be obtained when applied to any server.

In addition, all of the contents of Japanese Patent Application Nos. 11(1999)-92384, 11(1999)-92385, 11(1999)-92386, 11(1999)-92387 and 2000-96559 are incorporated into this specification by reference.

What is claimed is:

1. An image search server connected to a database storing images and to a plurality of image display terminals, for searching the database in response to a search request of any of the image display terminals and for outputting a search result to the image display terminal, the image search server comprising:

storing means for storing an image obtained from the database; and control means having, for each of the image display terminals, setting defining whether only the storing means or the storing means as well as the database, are searched, and for determining where to search according to the setting for each terminal.

2. An image search server connected to a database storing images and to a plurality of image display terminals, for searching the database in response to a request of any of the image display terminals and for displaying a search result on the terminal, the image search server comprising:

storing means for storing an image obtained from the database; and control means having, for each image recording modality, setting defining whether only the storing means, or the storing means as well as the database, are searched, and for determining where to search according to the setting for each image recording modality.

3. An image search server connected to an image display terminal and to a database storing images, for carrying out a search of the database in response to a request of the image display terminal and for outputting a search result to the terminal, the image search server comprising:

image processing means for carrying out predetermined image processing on the image obtained by the search;

storing means for storing the image having been subjected to the image processing by the image processing means;

judging means for judging whether or not image processing is necessary for the image having been searched for; and control means for transmitting to the image display terminal a search result including information indicating a location of the image in the database in the case where the judging means has judged image processing to be unnecessary or for transmitting a search result including information indicating that the image is located in the storing means while obtaining the image from the database for causing the image to be subjected to the image processing by the image processing means in the case where the judging means has judged the image processing to be necessary.

4. An image search server as claimed in claim 3, the image search server being connected to a plurality of databases, wherein the information sent by the control means to the image display terminal to indicate the location of the image in the database shows which of the databases has the image.

5. An image search server as claimed in claim 3 or 4, the image search server being connected to a plurality of image display terminals, wherein the judging means has setting defining necessity or lack of necessity of image processing for each display terminal and judges according to the setting.

6. An image search server as claimed in claim 3 or 4 wherein the judging means has setting defining necessity or lack of necessity of image processing by the image processing means for each modality having recorded the images stored, and judges according to the setting.

7. A medical image server comprising image acquisition means for fetching an image from an image archiving apparatus storing medical images, storing means for storing the image having been fetched, and delivering means for outputting the image stored in the storing means to a terminal, the medical image server further comprising:

pre-fetching judging means for carrying out judgment as to whether acquisition of a past image of a patient which is stored in the image archiving apparatus is necessary or unnecessary before the terminal actually sends an order for output of the image, based on information regarding a medical examination order and/or photographing of the patient; and pre-fetching image selecting means for selecting an image of the patient from past images stored in the image archiving apparatus based on the information regarding the medical examination order and/or photographing in the case where the pre-fetching judging means has judged the acquisition to be necessary, and for causing the image acquisition means to fetch the selected image.

8. A medical image server as claimed in claim 7, wherein the pre-fetching judging means judges whether the acquisition of the past image is necessary or unnecessary based on information from RIS (Radiology department Information System) and/or information attached to an image taken on a predetermined day.

9. A medical image server as claimed in claim 8, wherein the pre-fetching image selecting means determines a selection range of images based on information from RIS (Radiology department Information System) and/or information attached to an image taken on a predetermined day.

10. A medical image server as claimed in claim 7, wherein the pre-fetching judging means judges whether the acquisition of the past image is necessary or unnecessary based on a preset condition required for the past image to be acquired defined by one of or any combination of a name of an image requesting department, a name of an image requesting doctor, an image recording modality, and a photographing menu.

11. A medical image server as claimed in claim 10, wherein the pre-fetching image selecting means selects the past image based on preset selection ranges of the name of the image requesting department, the name of the image requesting doctor, the image recording modality and the photographing menu, which are preset for each of the conditions required for the past image to be acquired as defined in claim 3.

12. A medical image server as claimed in claim 11, wherein the pre-fetching image selecting means is capable of specifying a setting of a period in which the past image to be acquired was photographed, for each setting of the selection range.

13. A medical image server as claimed in claim 7, wherein the pre-fetching judging means judges whether the acquisition of the past image is necessary or unnecessary based on a judging standard which is one of or any combination of a name of an image requesting department, a name of an image requesting doctor, an image recording modality and a photographing menu, which are contained in information from RIS (Radiology department Information System) and/or information attached to an image taken on the day, by comparing the judging standard with a preset condition required for a past image to be acquired which is defined by one of or any combination of a name of an image requesting department, a name of an image requesting doctor, a image recording modality and a photographing menu.

14. A medical image server as claimed in claim 13, wherein the pre-fetching image selecting means selects the past image based on a selection standard which is one of or any combination of a name of an image requesting department, a name of an image requesting doctor, an image recording modality and a photographing menu, which are contained in information from RIS (Radiology department Information System) and/or information attached to an image taken on the day, by comparing the selection standard with a preset selection condition preset for each of the conditions required for the past image to be acquired as defined in claim 4, wherein the selection condition is defined by one of or any combination of a name of an image requesting department, a name of an image requesting doctor, an image recording modality and a photographing menu.

15. A medical image server as claimed in claim 14, wherein the pre-fetching image selecting means is capable of specifying a setting of a period in which the past image to be acquired was photographed, for each setting of the selection range.

16. A medical image server as claimed in claim 7, wherein the pre-fetching image selecting means selects only a past image of a patient having a medical examination appointment on a predetermined day and on a following day in the case where the image to be acquired is selected based on the examination order.

17. A medical image server as claimed in claim 16, wherein the pre-fetching image selecting means selects a past image of a patient having a medical examination appoint on a predetermined day in priority over a patient for a following day.

18. A medical image server as claimed in claim 7, further comprising:
means for reducing or compressing a past image fetched from the image archiving apparatus and stored in the storing means; and
means for setting a reduction ratio or a compression ratio used by the means for reduction or compression, for one of or any combination of a name of an image requesting department, a name of an image requesting doctor, an image recording modality and a photographing menu regarding the past image.

19. A medical image server as claimed in claim 1, further comprising controlling means which causes the image selection by the pre-fetching image selecting means and the acquisition of the selected image by the image acquisition means to be executed at predetermined times.

20. A medical image server as claimed in claim 7, further comprising controlling means which retains information of a medical examination order and causes the image selection by the pre-fetching image selecting means and the acquisition of the selected image by the image acquisition means to be executed based on the information of the medical examination order, wherein
the controlling means compares check-in information of a patient to be photographed and appointment information when receiving the check-in information on the day of the medical examination and causes selection of an additional image by the pre-fetching image selecting means and acquisition of the selected additional image by the image acquisition means to be executed only if the check-in information was not identical with the appointment information.

21. A medical image server as claimed in claim 7, further comprising controlling means which causes the delivery of the image by the delivering means to be executed after letting the delivering means wait until a predetermined time.

22. A medical image server as claimed in claim 7, further comprising controlling means which causes the image selection by the pre-fetching image selecting means and the acquisition of the selected image by the image acquisition means to be executed at a time of appointment of a medical examination order and which causes the delivery of the image by the delivering means to be executed when receiving check-in information on the day of the medical examination.

23. A medical image server as claimed in claim 7, further comprising controlling means which causes the image selection by the pre-fetching image selecting means and the acquisition of the selected image by the image acquisition means to be executed at a time of appointment of a medical examination order or when receiving check-in information on the day of the medical examination, and which causes the delivery of the image by the delivering means to be executed when receiving information indicating completion of the photographing from an image recording device or RIS (Radiology department Information System).

24. A medical image server as claimed in claim 7, further comprising controlling means which causes the delivery of the image by the delivering means to be executed when the image is input from the image recording device.

25. A medical image server as claimed in claim 7, further comprising controlling means which can be used to specify periods in which the delivering means is allowed to deliver the image, and which suspends the delivery of the image until the next specified period when the output request is received at a time out of any specified period.

26. A medical image server as claimed in claim 7, further comprising:
delivery judging means for judging whether the delivery of the image stored in the storing means is necessary or unnecessary based on information regarding a medical examination order and/or photographing of a patient;

means for selecting an image to be delivered which selects the image to be delivered from past images of the patient stored in the storing means based on the information regarding the medical examination order and/or photographing and which causes the delivering means to deliver the selected image; and means for determining a past-image delivery destination which determines a destination to which the delivering means delivers the selected image, wherein the destination is determined based on the information regarding the medical examination order and/or photographing.

27. A medical image server as claimed in claim 26, wherein the delivery judging means judges whether the delivery of the past image is necessary or unnecessary based on the information from RIS (Radiology department Information System) and/or the information attached to the image taken on the day.

28. A medical image server as claimed in claim 27, wherein the means for selecting the image to be delivered determines a selection range of the image based on information from RIS (Radiology department Information System) and/or information attached to the image taken on the day.

29. A medical image server as claimed in claim 28, wherein the means for determining the past-image delivery destination determines the delivery destination based on information from RIS (Radiology department Information System) and/or information attached to an image taken on the day.

30. A medical image server as claimed claim 29, wherein the means for determining the past-image delivery destination is capable of specifying a plurality of delivery destinations for a single image.

31. A medical image server as claimed in claim 26, wherein the delivery judging means judges whether the delivery of the past image is necessary or unnecessary based on a preset condition required for a past image to be acquired defined by one of or any combination of a name of an image requesting department, a name of an image requesting doctor, an image recording modality, and a photographing menu.

32. A medical image server as claimed in claim 31, wherein the means for selecting the image to be delivered selects the past image based on preset selection ranges of a name of an image requesting department, a name of an image requesting doctor, an image recording modality and a photographing menu, which are preset for each of the conditions required for the past image to be acquired as defined in claim 31.

33. A medical image server as claimed claim 32, wherein the means for determining the past-image delivery destination is determines the delivery destination based on a preset delivery destination defined by one of or any combination of a name of an image requesting department, a name of an image requesting doctor, an image recording modality, and a photographing menu.

34. A medical image server as claimed in claim 33, wherein the means for determining the past-image delivery destination is capable of specifying a plurality of delivery destinations for a single image.

35. A medical image server as claimed in claim 26, wherein the delivery judging means judges whether the delivery of the past image is necessary or unnecessary based on a judging standard which is one of or any combination of a name of an image requesting department, a name of an image requesting doctor, an image recording modality and a photographing menu, which are contained in information from RIS (Radiology department Information System) and/or information attached to the image taken on the day, by comparing the judging standard with a condition required for a past image to be acquired which is defined by one of or any combination of a name of an image requesting department, a name of an image requesting doctor, an image recording modality and a photographing menu.

36. A medical image server as claimed in claim 35, wherein the means for selecting the image to be delivered selects the past image based on a selection standard which is one of or any combination of a name of an image requesting department, a name of an image requesting doctor, an image recording modality and a photographing menu, which are contained in information from RIS (Radiology department Information System) and/or information attached to an image taken on the day, by comparing the selection standard with a preset selection condition preset for each of the conditions required for a past image to be acquired as defined in claim 23, wherein the selection condition is defined by one of or any combination of a name of an image requesting department, a name of an image requesting doctor, an image recording modality and a photographing menu.

37. A medical image server as claimed in claim 36, wherein the means for selecting the image to be delivered is capable of specifying a setting of a period in which the past image was photographed, for each setting of the selection range.

38. A medical image server as claimed in claim 36, wherein the means for determining the past-image delivery destination determines the delivery destination based on a destination-determining standard which is one of or any combination of a name of an image requesting department, a name of an image requesting doctor, an image recording modality and a photographing menu, which are contained in information from RIS (Radiology department Information System) and/or information attached to an image taken on the day, by referring to a preset delivery destination which is defined by one of or any combination of a name of an image requesting department, a name of an image requesting doctor, an image recording modality and a photographing menu.

39. A medical image server as claimed in claim 38, wherein the means for determining the past-image delivery destination is capable of specifying a plurality of delivery destinations for a single image.

40. A medical image server as claimed in claim 26, wherein the means for selecting the image to be delivered selects only a past image of the patient having the medical examination appointment on the day and on the following day in the case where the image is selected based on the medical examination order.

41. A medical image server as claimed in claim 40, wherein the means for selecting the image to be delivered selects a past image of a patient having a medical examination appointment on the day in priority over a patient for the following day.

42. A medical image server as claimed in claim 26, wherein the means for determining the past-image delivery destination is capable of specifying a plurality of delivery destinations for a single image.

43. A medical image server as claimed in claim 26, further comprising controlling means which searches a database at the delivery destination determined by the means for determining the past-image delivery destination and which causes the delivering means to cancel the delivery of the image if the database contained the image selected by the means for selecting the image to be delivered.

44. A medical image server as claimed in claim 26, further comprising:
   means for delivering an image taken on the day which delivers an image taken and recorded by an image recording modality to a separated terminal when receiving an order for output from the separated terminal on the day of recording; and
   means for determining a delivery destination of the image taken on the day which is delivered by the means for delivering the image based on the information regarding a medical examination order and/or photographing of a patient.

45. A medical image server as claimed in claim 44, wherein the means for determining the delivery destination of the image taken on the day is capable of specifying a plurality of delivery destinations for a single image.

46. A medical image server as claimed in claim 44, wherein the means for determining the delivery destination of the image taken on the day determines the delivery destination based on information from RIS (Radiology department Information System) and/or information attached to the image taken on the day.

47. A medical image server as claimed in claim 46, wherein the means for determining the delivery destination of the image taken on the day is capable of specifying a plurality of delivery destinations for a single image.

48. A medical image server as claimed in claim 44, wherein the means for determining the delivery destination of the image taken on the day determines the delivery destination based on a preset delivery destination defined by one of or any combination of a name of an image requesting department, a name of an image requesting doctor, an image recording modality, and a photographing menu.

49. A medical image server as claimed in claim 48, wherein the means for determining the delivery destination of the image taken on the day is capable of specifying a plurality of delivery destinations for a single image.

50. A medical image server as claimed in claim 44, wherein the means for determining the delivery destination of the image taken on the day determines the delivery destination based on a destination-determining standard which is one of or any combination of a name of an image requesting department, a name of an image requesting doctor, an image recording modality and a photographing menu, which are contained in information from RIS (Radiology department Information System) and/or information attached to the image taken on the day, by referring to a preset delivery destination which is defined by one of or any combination of a name of an image requesting department, a name of an image requesting doctor, an image recording modality and a photographing menu.

51. A medical image server as claimed in claim 50, wherein the means for determining the delivery destination of the image taken on the day is capable of specifying a plurality of delivery destinations for a single image.

52. A medical image server as claimed in claim 44, wherein the means for determining the delivery destination of the image taken on the day determines the delivery destination based on a code input by RIS (Radiology department Information System) or attached to the image, according to preset combinations of the delivery destinations and the codes so that each of the codes specifies one of the destinations directly.

53. A medical image server as claimed in claim 52, wherein the means for determining the delivery destination of the image taken on the day is capable of specifying a plurality of delivery destinations for a single image.

54. A medical image server as claimed in claim 44, wherein the means for determining the delivery destination of the image taken on the day and the means for determining the past-image delivery destination are configured to handle the delivery destinations according to the same settings and to deliver the images to the same device.

55. A medical image server as claimed in claim 7, further comprising:
   means for delivering an image taken on the day which delivers an image taken and recorded by an image recording modality to a separated terminal when receiving an order for output from the separated terminal on the day of recording; and
   means for determining a delivery destination of the image taken on the day which is delivered by the means for delivering the image based on the information regarding a medical examination order and/or photographing of a patient.

56. A medical image server as claimed in claim 55, wherein the means for determining the delivery destination of the image taken on the day is capable of specifying a plurality of delivery destinations for a single image.

57. A medical image server as claimed in claim 55, wherein the means for determining the delivery destination of the image taken on the day determines the delivery destination based on information from RIS (Radiology department Information System) and/or information attached to the image taken on the day.

58. A medical image server as claimed in claim 57, wherein the means for determining the delivery destination of the image taken on the day is capable of specifying a plurality of delivery destinations for a single image.

59. A medical image server as claimed in claim 55, wherein the means for determining the delivery destination of the image taken on the day determines the delivery destination based on a preset delivery destination defined by one of or any combination of a name of an image requesting department, a name of an image requesting doctor, an image recording modality, and a photographing menu.

60. A medical image server as claimed in claim 59, wherein the means for determining the delivery destination of the image taken on the day is capable of specifying a plurality of delivery destinations for a single image.

61. A medical image server as claimed in claim 55, wherein the means for determining the delivery destination of the image taken on the day determines the delivery destination based on a destination-determining standard which is one of or any combination of a name of an image requesting department, a name of an image requesting doctor, an image recording modality and a photographing menu, which are contained in information from RIS (Radiology department Information System) and/or information attached to the image taken on the day, by referring to a preset delivery destination which is defined by one of or any combination of a name of an image requesting department, a name of an image requesting doctor, an image recording modality and a photographing menu.

62. A medical image server as claimed in claim 61, wherein the means for determining the delivery destination of the image taken on the day is capable of specifying a plurality of delivery destinations for a single image.

63. A medical image server as claimed in claim 55, wherein the means for determining the delivery destination of the image taken on the day determines the delivery destination based on a code input by RIS (Radiology department Information System) or attached to the image, according to preset combinations of the delivery destinations and the codes so that each of the codes specifies one of the destinations directly.

64. A medical image server as claimed in claim 63, wherein the means for determining the delivery destination of the image taken on the day is capable of specifying a plurality of delivery destinations for a single image.

65. A medical image display system employing the medical image server as claimed in any of claims 7 to 54 comprising:
   a workstation comprising display means capable of displaying an image stored in the medical image server, judging means for judging whether or not an image need to be displayed is stored in the workstation, and means for sending to the medical server an order for output of the image need to be displayed when the judging means judges that the image is not stored in the workstation; wherein
   the medical server is configured to judge whether or not the image specified by the order for output is stored in the storing means when receiving the order for output from the workstation, to deliver the image therein to the workstation if the image was stored in the storing means, and to deliver the image to the workstation after fetching the image from the image archiving apparatus if the image was not stored in the storing means.

66. The medical image server of claim 7, wherein the image acquisition means fetches the selected image before the terminal actually sends an order for output of the image.

67. The medical image server of claim 7, wherein the pre-fetch judging means is located in a separate physical housing from the image archiving apparatus and said terminal, said terminal, pre-fetch judging means and image archiving apparatus being connected by a network.

68. A medical image searching method used in a medical image search apparatus connected to a search requesting apparatus and to a database storing medical images with text information, for searching the database for a desired image according to search information from the search requesting apparatus and for sending a search result including text information to the search requesting apparatus, the medical image searching method comprising the steps of:
   searching for the desired image after converting search information received from the search requesting apparatus to search information in a character type used by the database and different from a character type used by the search requesting apparatus; and
   sending the search result to the search requesting apparatus after the search result has been converted into the character type used by the search requesting apparatus.

69. An image searching method for an image search server connected to a database storing images and to a plurality of image display terminals, the image search server searching the database in response to a search request of any of the image display terminals and outputting a search result on the display terminal, the image searching method comprising the steps of:
   storing an image obtained from the database; and
   determining where to search for each image display terminal according to a pre-setting defining for each modality whether only a storing means of the server, or the storing means of the server as well as the database, are searched.

70. An image searching method for an image search server connected to a database storing images and to a plurality of image display terminals, the image search server searching the database in response to a search request of any of the image display terminals and outputting a search result on the display terminal, the image searching method comprising the steps of:
   storing an image obtained from the database; and
   determining where to search for each image recording modality, according to a presetting defining for each modality whether only a storing means of the server or the storing means of the server as well as the database, are searched.

71. A pre-fetching image-acquisition method used in a medical image server comprising image acquisition means for fetching an image from an image archiving apparatus storing medical images, storing means for storing the image having been fetched, and means for outputting the image stored in the storing means to a terminal when receiving an order for output of the image therefrom, comprising the steps of:
   judging whether acquisition of past images regarding a patient having been stored in the image archiving apparatus is necessary or unnecessary before the terminal actually sends the order for output of the image, based on information regarding a medical examination order and/or photographing of the patient;
   selecting an image of the patient from the past images stored in the image archiving apparatus, based on the information regarding the examination order and/or photographing, in the case where the acquisition is judged to be necessary; and
   causing the image acquisition means to fetch the selected image.

72. A pre-fetching image-acquisition method as claimed in claim 71, further comprising the steps of:
   judging whether delivery of the image stored in the storing means is necessary or unnecessary based on information regarding the medical examination order and/or photographing of the patient;
   selecting the image from the past images of the patient stored in the storing means based on the information regarding the medical examination order and/or photographing; and
   causing the delivering means to deliver the selected image; wherein
   a destination to which the delivering means delivers the selected image is determined based on the information regarding the medical examination order and/or photographing.

73. A pre-fetching image-acquisition method as claimed in claim 71 or 72, further comprising the step of:
   delivering an image taken and recorded by an image recording modality to a separated terminal in the case where an order for output is sent from the separated terminal on the day of recording; wherein
   a delivery destination of the image is determined based on the information regarding the medical examination order and/or photographing of the patient.

* * * * *